(12) United States Patent
Sakurazawa et al.

(10) Patent No.: US 11,979,482 B2
(45) Date of Patent: May 7, 2024

(54) DETECTION SYSTEM, DETECTION DEVICE, AND DETECTION METHOD

(71) Applicant: SUMITOMO ELECTRIC INDUSTRIES, LTD., Osaka (JP)

(72) Inventors: Satoru Sakurazawa, Osaka (JP); Isao Kato, Osaka (JP); Takanori Miyoshi, Osaka (JP); Yoichi Hata, Osaka (JP); Takumi Asaina, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 54 days.

(21) Appl. No.: 17/791,067

(22) PCT Filed: Oct. 8, 2020

(86) PCT No.: PCT/JP2020/038089
§ 371 (c)(1),
(2) Date: Jul. 6, 2022

(87) PCT Pub. No.: WO2021/152918
PCT Pub. Date: Aug. 5, 2021

(65) Prior Publication Data
US 2023/0022272 A1    Jan. 26, 2023

(30) Foreign Application Priority Data
Jan. 31, 2020 (JP) ................................. 2020-014866

(51) Int. Cl.
*H04L 25/02* (2006.01)
*H04B 10/079* (2013.01)
(Continued)

(52) U.S. Cl.
CPC ....... *H04L 7/0054* (2013.01); *H04B 10/0795* (2013.01); *H04L 7/02* (2013.01); *H04L 25/0212* (2013.01)

(58) Field of Classification Search
CPC .. H04M 2250/12; H04M 3/5116; H04M 1/60; H04M 1/82; H04M 11/06;
(Continued)

(56) References Cited

U.S. PATENT DOCUMENTS

2012/0166123 A1    6/2012  Hino et al.
2014/0341324 A1*  11/2014  Ito ........................ H04B 7/0885
                                                          375/347
(Continued)

FOREIGN PATENT DOCUMENTS

JP    H03-006467 A    1/1991
JP    H04-310855 A    11/1992
(Continued)

*Primary Examiner* — Eva Y Puente
(74) *Attorney, Agent, or Firm* — Oliff PLC

(57) ABSTRACT

A detection system includes: a signal output unit configured to output, to a measurement target, a measurement signal that exhibits a predetermined temporal change; a signal measurement unit configured to measure a response signal, to the measurement signal, from the measurement target; a calculation unit configured to calculate an impulse response of the measurement target, based on a measurement result of the response signal measured by the signal measurement unit; and a detection unit configured to detect abnormality regarding the measurement target, based on the impulse response calculated by the calculation unit.

7 Claims, 29 Drawing Sheets

(51) Int. Cl.
*H04L 7/00* (2006.01)
*H04L 7/02* (2006.01)

(58) Field of Classification Search
CPC .. H04M 2250/22; H04M 3/22; H04M 3/2236; H04M 9/082; H04W 84/18; H04W 24/08; H04W 12/02; H04W 12/041; H04W 12/10; H04W 24/00; H04W 24/04; H04W 4/70; H04W 16/28; H04W 72/20; H04W 74/0808; H04W 74/0833; H04W 88/16; H04L 25/0212; H04L 25/0228; H04L 2025/0349; H04L 25/0232; H04L 25/03057; H04L 25/03343; H04L 7/0054
USPC ............................................. 375/224
See application file for complete search history.

(56) References Cited

U.S. PATENT DOCUMENTS

| | | | | |
|---|---|---|---|---|
| 2019/0219679 | A1* | 7/2019 | Komatsu | G08G 1/052 |
| 2020/0310485 | A1* | 10/2020 | Luo | G01R 27/32 |
| 2021/0234619 | A1* | 7/2021 | Kikuchi | H04B 17/00 |

FOREIGN PATENT DOCUMENTS

| | | | |
|---|---|---|---|
| JP | H07-095684 | A | 4/1995 |
| JP | H08-145846 | A | 6/1996 |
| JP | 2003-106804 | A | 4/2003 |
| JP | 2011-022055 | A | 2/2011 |
| WO | 2015/186429 | A1 | 12/2015 |
| WO | 2018/203372 | A1 | 11/2018 |

\* cited by examiner

DETECTION SYSTEM, DETECTION DEVICE, AND DETECTION METHOD

TECHNICAL FIELD

The present disclosure relates to a detection system, a detection device, and a detection method.

This application claims priority on Japanese Patent Application No. 2020-14866 filed on Jan. 31, 2020, the entire content of which is incorporated herein by reference.

BACKGROUND ART

PATENT LITERATURE 1 (Japanese Laid-Open Patent Publication No. 2011-22055) discloses an impulse response measurement method as follows. That is, this impulse response measurement method includes: an input signal generating step of generating an input signal of an arbitrary waveform to be inputted to a system to be measured, by using a synchronization signal having a first sampling clock frequency; a signal converting step of converting a measured signal outputted from the system to be measured, into a discrete system by using a synchronization signal having a second sampling clock frequency; and an inverse filter correcting step of correcting at least a phase of an inverse filter, which is an inverse function of a function representing a frequency characteristic of the input signal, according to a frequency ratio of the first sampling clock frequency to the second sampling clock frequency. An impulse response of the system to be measured is measured by using the corrected inverse filter.

PATENT LITERATURE 2 (Japanese Laid-Open Patent Publication No. H3-6467) discloses an impulse response measurement method as follows. That is, this impulse response measurement method is a method for measuring, by using a non-impulse arbitrary waveform input signal to a linear time-invariant continuous-time system to be measured, and an inverse filter for the input signal, a discrete impulse response of the system to be-measured. In this method, the input signal has a flat spectrum in every discrete frequency, and has phase characteristics being continuous and proportional to the square of the discrete frequency. Furthermore, discrete Fourier transform of the input signal in the discrete frequency of half the number of samples is 1+j0.

PATENT LITERATURE 3 (Japanese Laid-Open Patent Publication No. H8-145846) discloses an optical frequency domain reflection measurement method as follows. That is, in this optical frequency domain reflection measurement method, in optical frequency domain reflection measurement, a delay optical fiber is inserted in a reference light path or a signal light path such that an optical path length difference between reference light, from an optical frequency swept light source, which directly reaches a photodetector, and signal light, from the optical frequency swept light source, which is reflected in an optical component to be measured and thereafter reaches the photodetector, becomes N times or more the length of the optical component to be measured, whereby, when output light from the optical frequency swept light source includes a high-order modulated sideband component, frequency bands occupied by beat signals, which are caused by modulated sideband components of (N−1) and lower orders, are separated from each other.

PATENT LITERATURE 4 (Japanese Laid-Open Patent Publication No. H7-95684) discloses an acoustic characteristic correcting device as follows. That is, the acoustic characteristic correcting device includes: measurement signal generating means for outputting a TSP signal as a measurement signal; inverse filter means to which a signal obtained by reproducing the generated measurement signal with a speaker and picking up the reproduced signal with a microphone is inputted, and which obtains an impulse response by time compression through convolution of the inputted signal and inverse filter characteristics of the TSP signal; frequency conversion means for frequency-converting the obtained impulse response to obtain measurement characteristic information of response characteristics of a reproduction system including a sound field; desired characteristic setting means for setting desired characteristics of the response characteristics of the reproduction system including the sound field, based on an operation of an operator; correction characteristic calculation means for calculating correction characteristics of the response characteristics for realizing the desired characteristics, based on the desired characteristics and the measurement characteristics; and correction characteristic provision means for providing an acoustic signal to be reproduced with the calculated correction characteristics through convolution. The inverse filter means and the correction characteristic provision means perform convolution by using a common convolution calculator.

CITATION LIST

Patent Literature

PATENT LITERATURE 1: Japanese Laid-Open Patent Publication No. 2011-22055
PATENT LITERATURE 2: Japanese Laid-Open Patent Publication No. H3-6467
PATENT LITERATURE 3: Japanese Laid-Open Patent Publication No. H8-145846
PATENT LITERATURE 4: Japanese Laid-Open Patent Publication No. H7-95684

SUMMARY OF THE INVENTION

A detection system of the present disclosure includes: a signal output unit configured to output, to a measurement target, a measurement signal that exhibits a predetermined temporal change; a signal measurement unit configured to measure a response signal, to the measurement signal, from the measurement target; a calculation unit configured to calculate an impulse response of the measurement target, based on a measurement result of the response signal measured by the signal measurement unit; and a detection unit configured to detect abnormality regarding the measurement target, based on the impulse response calculated by the calculation unit.

A detection device of the present disclosure includes: a signal output unit configured to output, to a measurement target, a measurement signal that exhibits a predetermined temporal change; and a signal measurement unit configured to measure a response signal, to the measurement signal, from the measurement target.

A detection method of the present disclosure is used in a detection system, and includes: outputting, to a measurement target, a measurement signal that exhibits a predetermined temporal change; measuring a response signal, to the measurement signal, from the measurement target; calculating an impulse response of the measurement target, based on a measurement result of the response signal; and detecting abnormality regarding the measurement target, based on the calculated impulse response.

One mode of the present disclosure can be realized not only as a detection system that includes such a characteristic processing unit but also as a semiconductor integrated circuit that realizes a part or the entirety of the detection system, or as a program for causing a computer to execute process steps in the detection system. Moreover, one mode of the present disclosure can be realized not only as a detection device that includes such a characteristic processing unit but also as a semiconductor integrated circuit that realizes a part or the entirety of the detection device, or as a program for causing a computer to execute process steps in the detection device.

DETAILED DESCRIPTION

Figure 1:
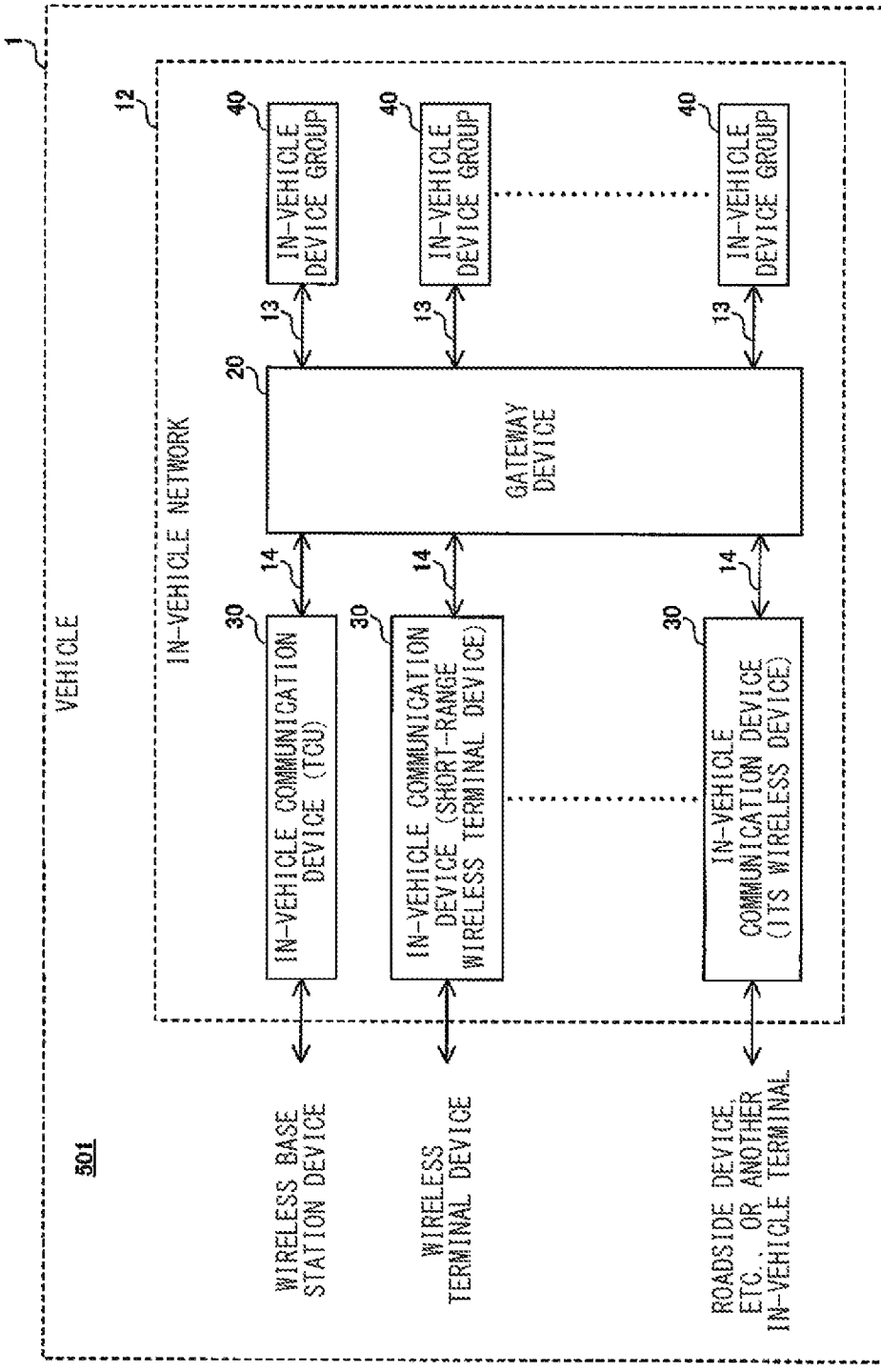
FIG. 1 shows a configuration of a communication system according to a first embodiment of the present disclosure.

To date, technologies for improving security in networks have been developed.

Problems to be Solved by the Present Disclosure

Beyond the technologies described in PATENT LITERATURES 1 to 4, there is a demand for a technology that can realize an excellent function regarding security in a network.

The present disclosure has been made in order to solve the above problem. An object of the present disclosure is to provide a detection system, a detection device, a management device, and a detection method that can realize an excellent function regarding security in a network.

Effects of the Present Disclosure

According to the present disclosure, it is possible to realize an excellent function regarding security in a network.

Description of Embodiments of the Present Disclosure

First, contents of embodiments of the present disclosure are listed and described.

(1) A detection system according to an embodiment of the present disclosure includes: a signal output unit configured to output, to a measurement target, a measurement signal that exhibits a predetermined temporal change; a signal measurement unit configured to measure a response signal, to the measurement signal, from the measurement target; a calculation unit configured to calculate an impulse response of the measurement target, based on a measurement result of the response signal measured by the signal measurement unit; and a detection unit configured to detect abnormality regarding the measurement target, based on the impulse response calculated by the calculation unit.

In the above configuration, the measurement signal that exhibits a predetermined temporal change is outputted to the measurement target, and the impulse response of the measurement target is calculated based on the response signal from the measurement target. Therefore, calculation of the impulse response and detection of abnormality can be performed with a simpler configuration as compared to the configuration using TDR (Time Domain Reflectometry) and a network analyzer, for example. Moreover, since the response signal can be measured at a higher SN (Signal-Noise) ratio as compared to the configuration using a network analyzer, for example, calibration of a measurement instrument or the like can be facilitated. Moreover, the response signal can be measured at a higher SN ratio as compared to the configuration using an impulse signal as a measurement signal, for example. As a result, abnormality regarding the measurement target can be more accurately detected with high reproducibility while separating non-linear noise. Therefore, it is possible to realize an excellent function regarding security in the network.

(2) Preferably, the detection unit calculates a response waveform, to a reference signal, of the measurement target, based on the impulse response and on waveform information of the reference signal which is a predetermined signal, and specifies an abnormality occurrence position in the measurement target, based on the calculated response waveform.

In the above configuration, countermeasures can be taken against abnormality that has occurred in the measurement target. Specifically, for example, when abnormality regarding a transmission line as an example of the measurement target has occurred, communication can be continued by using a transmission path bypassing the specified abnormality occurrence position.

(3) Preferably, the detection unit detects abnormality regarding the measurement target, based on a result of comparison between frequency characteristics of the impulse response, and frequency characteristics of the impulse response based on a past measurement result of the response signal measured by the signal measurement unit.

In the above configuration, change in electrical capacitance of the measurement target can be detected as abnormality in the measurement target, based on change in phase and impedance of the frequency characteristics, for example. Moreover, abnormality regarding the measurement target can be more accurately detected in consideration of change in frequency characteristics based on deterioration over time of the measurement target.

(4) Preferably, the signal output unit notifies the signal measurement unit of a timing about output of the measurement signal, and the signal measurement unit measures the response signal in synchronization with the signal output unit by using the timing notified from the signal output unit.

In the above configuration, since the response signal from the measurement target can be measured at an appropriate timing, processing loads can be reduced, and the response signal from the measurement target can be more accurately measured.

(5) Preferably, the measurement target is a transmission path, and the detection unit detects, as abnormality regarding the measurement target, connection of new equipment to the transmission path.

In the above configuration, when connection of new equipment to the transmission path has been detected, security measures, such as suspending communication using the transmission path, can be taken.

(6) A detection device according to the embodiment of the present disclosure includes: a signal output unit configured to output, to a measurement target, a measurement signal that exhibits a predetermined temporal change; and a signal measurement unit configured to measure a response signal, to the measurement signal, from the measurement target.

In the above configuration, the measurement signal that exhibits a predetermined temporal change is outputted to the measurement target, and the response signal from the measurement target is measured. Thus, for example, an impulse response of the measurement target can be calculated based on the measurement result of the response signal, and abnormality regarding the measurement target can be detected based on the calculated impulse response. Therefore, calculation of the impulse response and detection of abnormality can be performed with a simpler configuration as compared to the configuration using TDR and a network analyzer, for example. Moreover, since the response signal can be measured at a higher SN ratio as compared to the configuration using a network analyzer, for example, calibration of a measurement instrument or the like can be facilitated. Moreover, the response signal can be measured at a higher SN ratio as compared to the configuration using an impulse signal as a measurement signal, for example. As a result, abnormality regarding the measurement target can be more accurately detected with high reproducibility while separating non-linear noise. Therefore, it is possible to realize an excellent function regarding security in the network.

(7) A detection method according to the embodiment of the present disclosure is used in a detection system, and includes: outputting, to a measurement target, a measurement signal that exhibits a predetermined temporal change; measuring a response signal, to the measurement signal, from the measurement target; calculating an impulse response of the measurement target, based on a measurement result of the response signal; and detecting abnormality regarding the measurement target, based on the calculated impulse response.

In the above method, the measurement signal that exhibits a predetermined temporal change is outputted to the measurement target, and the impulse response of the measurement target is calculated based on the response signal from the measurement target. Therefore, calculation of the impulse response and detection of abnormality can be performed with a simpler configuration as compared to the configuration using TDR and a network analyzer, for example. Moreover, since the response signal can be measured at a higher SN ratio as compared to the configuration using a network analyzer, for example, calibration of a measurement instrument or the like can be facilitated. Moreover, the response signal can be measured at a higher SN ratio as compared to the configuration using an impulse signal as a measurement signal, for example. As a result, abnormality regarding the measurement target can be more accurately detected with high reproducibility while separating non-linear noise. Therefore, it is possible to realize an excellent function regarding security in the network.

Hereinafter, embodiments of the present disclosure will be described with reference to the drawings. In the drawings, the same or corresponding parts are denoted by the same reference signs, and description thereof is not repeated. At least some parts of the embodiment described below may be combined as desired.

First Embodiment

[Configuration and Basic Operation]

FIG. 1 shows a configuration of a communication system according to a first embodiment of the present disclosure.

With reference to FIG. 1, a communication system 501 includes a gateway device 20, a plurality of in-vehicle communication devices 30, and a plurality of in-vehicle device groups 40.

The communication system 501 is mounted in a vehicle 1, for example. The communication system 501 may be used for a home network or factory automation.

An in-vehicle network 12 includes the gateway device 20 and transmission lines 13, 14.

The plurality of in-vehicle communication devices 30 are connected to the gateway device 20 via corresponding transmission lines 14. Each transmission line 14 is an Ethernet (registered trademark) cable, for example.

The in-vehicle communication devices 30 communicate with devices outside the vehicle 1, for example. Specifically, examples of the in-vehicle communication devices 30 include a TCU (Telematics Communication Unit), a short-range wireless terminal device, and an ITS (Intelligent Transport Systems) wireless device.

The plurality of in-vehicle device groups 40 are connected to the gateway device 20 via corresponding transmission lines 13. Each transmission line 13 is a transmission line according to, for example, a standard of CAN (Controller Area Network) (registered trademark), FlexRay (registered trademark), MOST (Media Oriented Systems Transport) (registered trademark), Ethernet, LIN (Local Interconnect Network), or the like.

Figure 2:
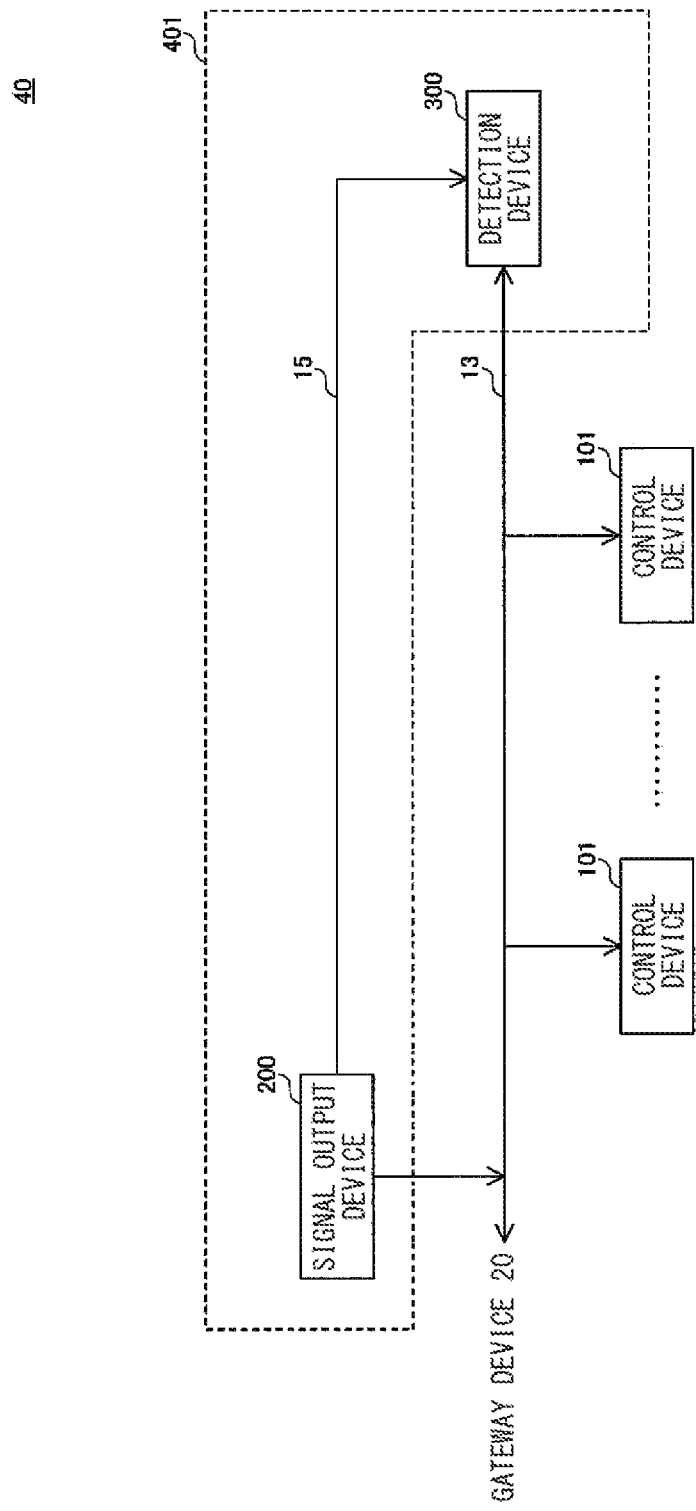
FIG. 2 shows a configuration of an in-vehicle device group according to the first embodiment of the present disclosure.

FIG. 2 shows a configuration of an in-vehicle device group according to the first embodiment of the present disclosure.

With reference to FIG. 2, the in-vehicle device group 40 is connected to the gateway device 20 via a corresponding bus, according to the CAN standard, which is an example of the transmission line 13.

The in-vehicle device group 40 includes a detection system 401 and a plurality of control devices 101 connected to the transmission line 13. The in-vehicle device group 40 has a bus-type topology.

The gateway device 20, the in-vehicle communication devices 30, and the control devices 101 are examples of in-vehicle devices.

Each control device 101 communicates with another in-vehicle device connected to the in-vehicle network 12, via the transmission line 13. For example, each control device 101 transmits a signal including various kinds of information to the gateway device 20 via the transmission line 13.

Each control device 101 is an ECU (Electronic Control Unit), for example. The in-vehicle device group 40 may not necessarily include a plurality of control devices 101, and may include one control device 101. The in-vehicle device group 40 may include, as in-vehicle devices, devices such as an actuator and a sensor connected to the transmission line 13.

The transmission lines 13 are provided for different types of systems, for example. Specifically, the transmission lines 13 are implemented as a drive-related bus, a chassis/safety-related bus, a body/electrical-equipment-related bus, and an AV/information-related bus, for example.

An engine control device, an AT (Automatic Transmission) control device, and an HEV (Hybrid Electric Vehicle) control device, which are examples of the control device 101, are connected to the drive-related bus. The engine control device, the AT control device, and the HEV control device control an engine, an AT, and switching between the engine and a motor, respectively.

A brake control device, a chassis control device, and a steering control device, which are examples of the control device 101, are connected to the chassis/safety-related bus. The brake control device, the chassis control device, and the steering control device control a brake, a chassis, and steering, respectively.

An instrument indication control device, an air conditioner control device, a burglar prevention control device, an air bag control device, and a smart entry control device, which are examples of the control device 101, are connected to the body/electrical-equipment-related bus. The instrument indication control device, the air conditioner control device, the burglar prevention control device, the air bag control device, and the smart entry control device control instruments, an air conditioner, a burglar prevention mechanism, an air bag mechanism, and smart entry, respectively.

A navigation control device, an audio control device, an ETC (Electronic Toll Collection System) (registered trademark) control device, and a telephone control device, which are examples of the control device 101, are connected to the AV/information-related bus. The navigation control device, the audio control device, the ETC control device, and the telephone control device control a navigation device, an audio device, an ETC device, and a mobile phone, respectively.

The gateway device 20 is, for example, a central gateway (CGW), and can communicate with other in-vehicle devices.

For example, the gateway device 20 performs a relay process of relaying, in the vehicle 1, information transmitted/received between in-vehicle device groups 40 connected to different transmission lines 13, information transmitted/received between in-vehicle communication devices 30, and information transmitted/received between an in-vehicle device group 40 and an in-vehicle communication device 30.

[Detection System]

The detection system 401 includes a signal output device 200 and a detection device 300. The signal output device 200 and the detection device 300 are connected to each other via a transmission line 15.

The signal output device 200 and the detection device 300 are connected to a transmission line 13. More specifically, for example, the signal output device 200 is connected near a first end, on the gateway device 20 side, of the transmission line 13, while the detection device 300 is connected to a second end, on the side opposite to the gateway device 20, of the transmission line 13.

Figure 3:
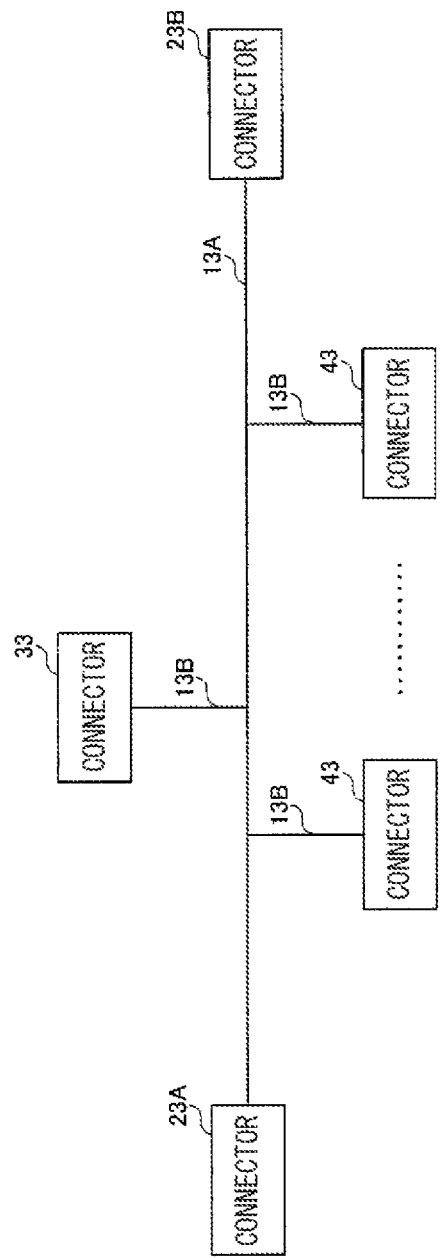
FIG. 3 shows a configuration of a transmission line according to the first embodiment of the present disclosure.

FIG. 3 shows a configuration of a transmission line according to the first embodiment of the present disclosure. FIG. 3 shows a configuration of a transmission line 13.

With reference to FIG. 3, the transmission line 13 includes connectors 23A, 23B, a connector 33, a plurality of connectors 43, a main line 13A, and a plurality of sub-lines 13B drawn out from the main line 13A. The transmission line 13 is a bus-type transmission path. The connector 23A is connected to a first end of the main line 13A. The connector 23B is connected to a second end of the main line 13A. That is, the main line 13A connects the connector 23A and the connector 23B. Each of the connectors 33, 43 is connected to a sub-line 13B. The gateway device 20 and the signal output device 200 are connected to the connector 23A. The detection device 300 is connected to the connector 23B. The plurality of control devices 101 are connected to the connectors 43, respectively. The connector 33 is an auxiliary connector not being used. The connector 33 is an open end.

The detection system 401 detects abnormality regarding the transmission line 13 which is an example of a measurement target. The transmission line 13 is an example of a transmission path. The transmission line 13 is a linear time invariant system, for example.

[Signal Output Device]

Figure 4:
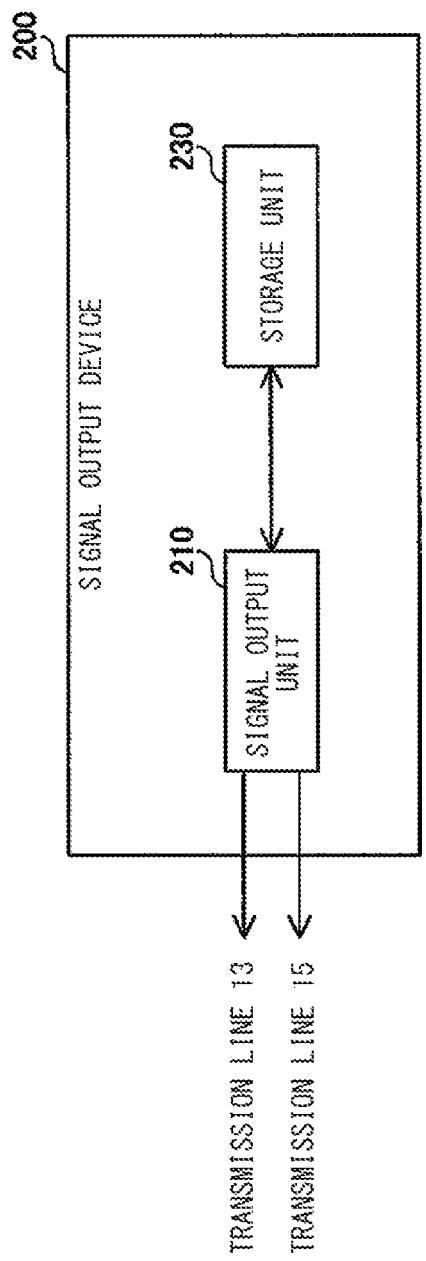
FIG. 4 shows a configuration of a signal output device according to the first embodiment of the present disclosure.

FIG. 4 shows a configuration of a signal output device according to the first embodiment of the present disclosure.

With reference to FIG. 4, the signal output device 200 includes a signal output unit 210 and a storage unit 230. The signal output unit 210 is realized by a processor such as a CPU (Central Processing Unit) or a DSP (Digital Signal Processor), for example. The storage unit 230 is a nonvolatile memory, for example.

The signal output unit 210 outputs, to the transmission line 13, a measurement signal that exhibits a predetermined temporal change. For example, the signal output unit 210 outputs, to the transmission line 13, a measurement signal whose frequency exhibits a predetermined temporal change. Specifically, the signal measurement unit 320 outputs, to the transmission line 13, a measurement signal S(t) represented as a function of time t. The measurement signal is a signal to be used in the signal measurement unit 320 for measurement of a response signal described later.

More specifically, in an output period Tout, the signal output unit 210 periodically or non-periodically outputs a measurement signal whose frequency exhibits a predetermined temporal change, to the transmission line 13. The measurement signal is a sinusoidal signal, for example.

Figure 5:
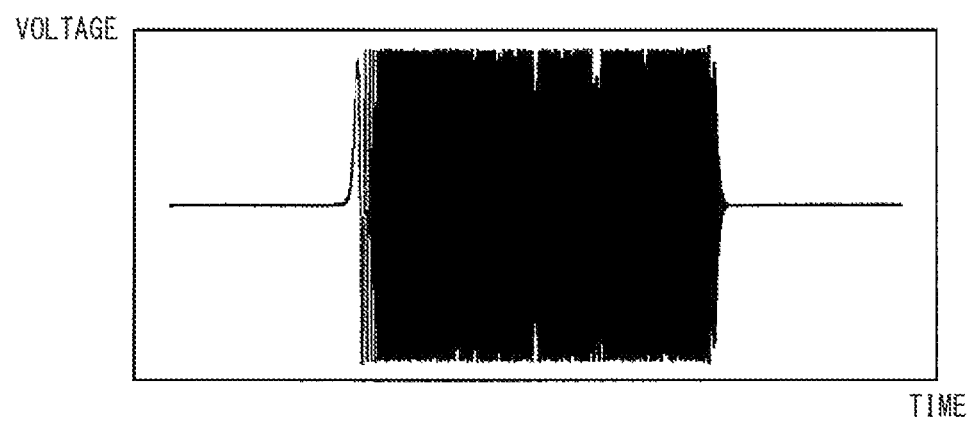
FIG. 5 shows an example of a measurement signal outputted from a signal output unit according to the first embodiment of the present disclosure.

FIG. 5 shows an example of a measurement signal outputted from the signal output unit according to the first embodiment of the present disclosure. In FIG. 5, the vertical axis represents voltage, and the horizontal axis represents time.

Figure 6:
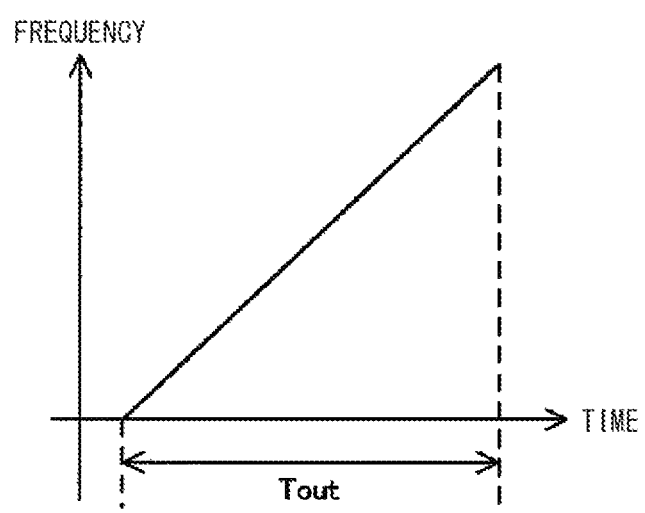
FIG. 6 shows an example of a temporal change in a frequency of the measurement signal outputted from the signal output unit according to the first embodiment of the present disclosure.

FIG. 6 shows an example of a temporal change in frequency of a measurement signal outputted from the signal output unit according to the first embodiment of the present disclosure. In FIG. 6, the vertical axis represents frequency, and the horizontal axis represents time.

With reference to FIG. 6, for example, in the output period Tout, the signal output unit 210 outputs, as a measurement signal, a TSP (Time Stretched Pulse) signal which is a sinusoidal signal whose frequency linearly and continuously increases, to the transmission line 13.

More specifically, the storage unit 230 stores therein TSP data as digital data of the TSP signal.

The signal output unit 210 further includes a digital-analog conversion circuit. For example, at an output timing according to a predetermined cycle, the signal output unit 210 outputs a TSP signal to the transmission line 13. The TSP signal has been generated by acquiring the TSP data from the storage unit 230, and converting the acquired TSP data to an analog signal by the digital-analog conversion circuit.

The signal output unit 210 may output a signal, other than the TSP signal, which exhibits a temporal change as shown in FIG. 6, as a measurement signal to the transmission line 13.

FIG. 7 to FIG. 11 show other examples of the measurement signal outputted from the signal output unit according to the first embodiment of the present disclosure. In FIG. 7 to FIG. 11, the vertical axis represents frequency, and the horizontal axis represents time.

Figure 7:
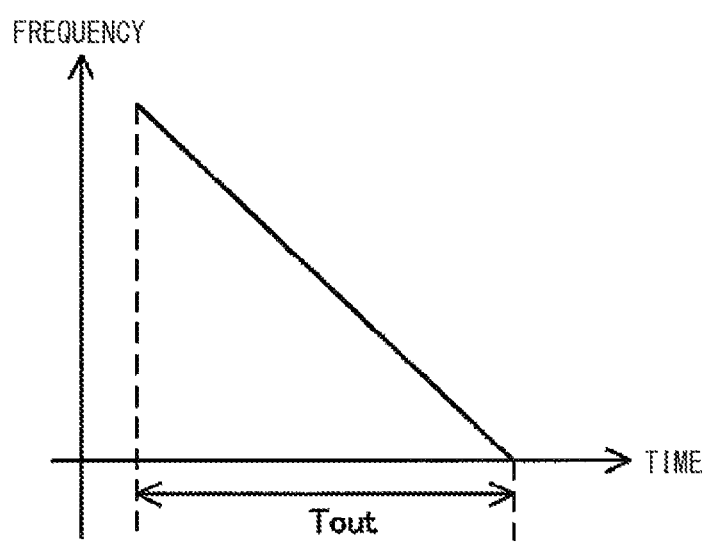
FIG. 7 shows another example of the measurement signal outputted from the signal output unit according to the first embodiment of the present disclosure.

With reference to FIG. 7, in the output period Tout, the signal output unit 210 may output a sinusoidal signal whose frequency linearly and continuously decreases, as a measurement signal to the transmission line 13.

Figure 8:
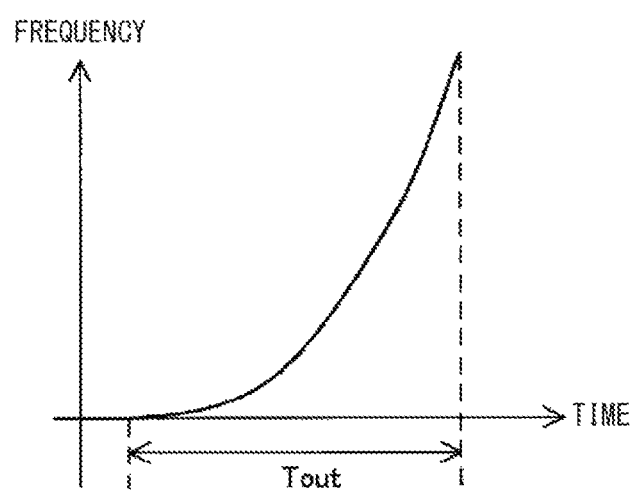
FIG. 8 shows another example of the measurement signal outputted from the signal output unit according to the first embodiment of the present disclosure.

With reference to FIG. 8, in the output period Tout, the signal output unit 210 may output a Log-SS (Logarithmic Swept Sine) signal which is a sinusoidal signal whose frequency exponentially and continuously increases, as a measurement signal to the transmission line 13.

Figure 9:
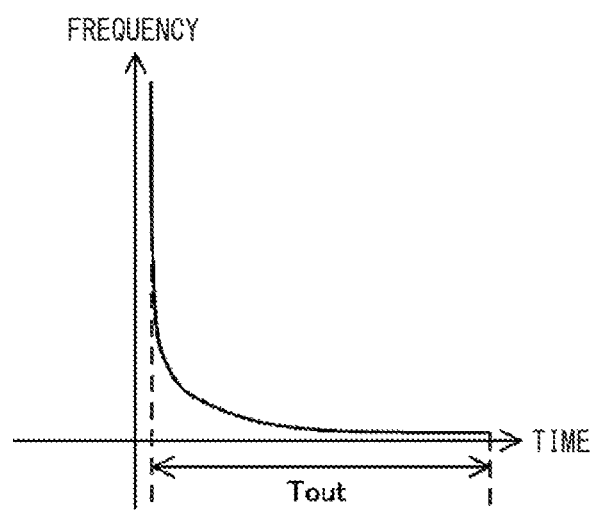
FIG. 9 shows another example of the measurement signal outputted from the signal output unit according to the first embodiment of the present disclosure.

With reference to FIG. 9, in the output period Tout, the signal output unit 210 may output a sinusoidal signal whose frequency exponentially and continuously decreases, as a measurement signal to the transmission line 13.

Figure 10:
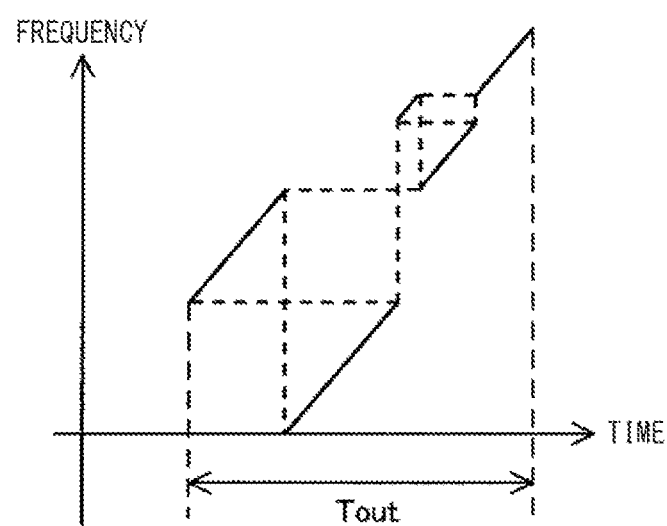
FIG. 10 shows another example of the measurement signal outputted from the signal output unit according to the first embodiment of the present disclosure.

With reference to FIG. 10, in the output period Tout, the signal output unit 210 may output a sinusoidal signal whose frequency linearly and intermittently increases, as a measurement signal to the transmission line 13.

Figure 11:
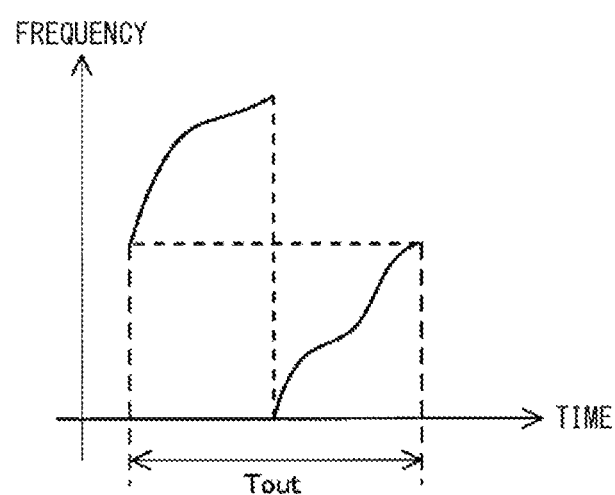
FIG. 11 shows another example of the measurement signal outputted from the signal output unit according to the first embodiment of the present disclosure.

With reference to FIG. 11, in the output period Tout, the signal output unit 210 may output a sinusoidal signal whose frequency intermittently increases, as a measurement signal to the transmission line 13.

Meanwhile, in the output period Tout, the signal output unit 210 may output a sinusoidal signal whose frequency linearly and intermittently decreases or a sinusoidal signal whose frequency intermittently decreases, as a measurement signal to the transmission line 13. Alternatively, the signal output unit 210 may selectively output, to the transmission line 13, one type of measurement signal among a plurality of types of measurement signals, according to a frequency range to be noted in a detection process using a frequency characteristic H(f) generated by a detection unit 340 described later, for example.

For example, the signal output unit 210 notifies the detection device 300 of a timing concerning output of the measurement signal.

More specifically, the signal output unit 210 transmits, to the detection device 300 via the transmission line 15, a synchronization signal indicating a timing to start output of the measurement signal.

The signal output unit 210, which has transmitted the synchronization signal to the detection device 300, starts the output period Tout, and outputs the measurement signal to the transmission line 13.

[Detection Device]

Figure 12:
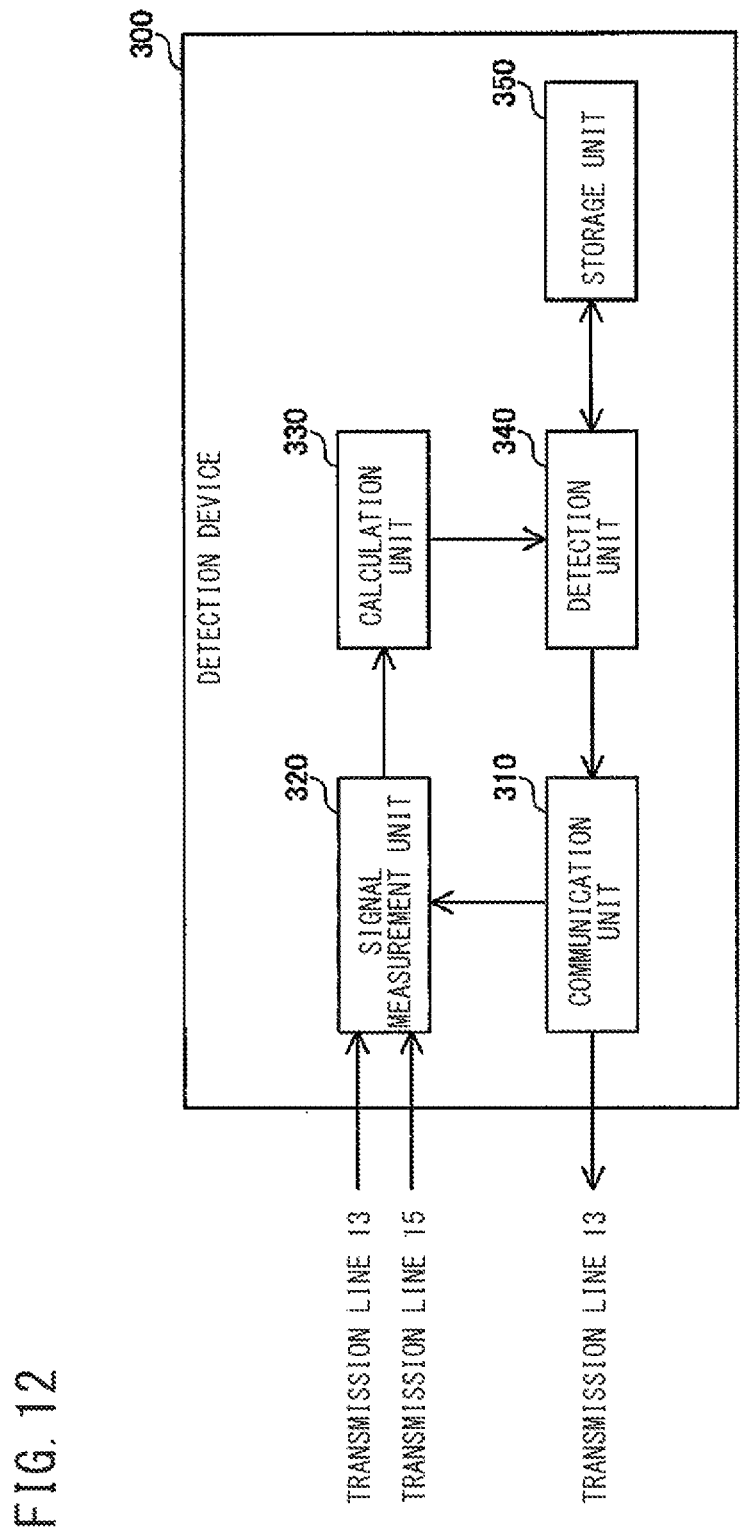
FIG. 12 shows a configuration of a detection device according to the first embodiment of the present disclosure.

FIG. 12 shows a configuration of a detection device according to the first embodiment of the present disclosure.

With reference to FIG. 12, a detection device 300 includes a communication unit 310, a signal measurement unit 320, a calculation unit 330, a detection unit 340, and a storage unit 350.

The communication unit 310, the signal measurement unit 320, the calculation unit 330, and the detection unit 340 are realized by a processor such as a CPU or a DSP, for example. The storage unit 350 is a nonvolatile memory, for example.

[Signal Measurement Unit]

The signal measurement unit 320 measures a response signal, to the measurement signal, from the transmission line 13. For example, the signal measurement unit 320 measures a response signal indicating transmission characteristics of the transmission line 13. Specifically, in a measurement period Tm, the signal measurement unit 320 measures, as a response signal, a TSP signal that has been outputted to the transmission line 13 from the signal output unit 210 in the signal output device 200 and transmitted through the transmission line 13.

Figure 13:
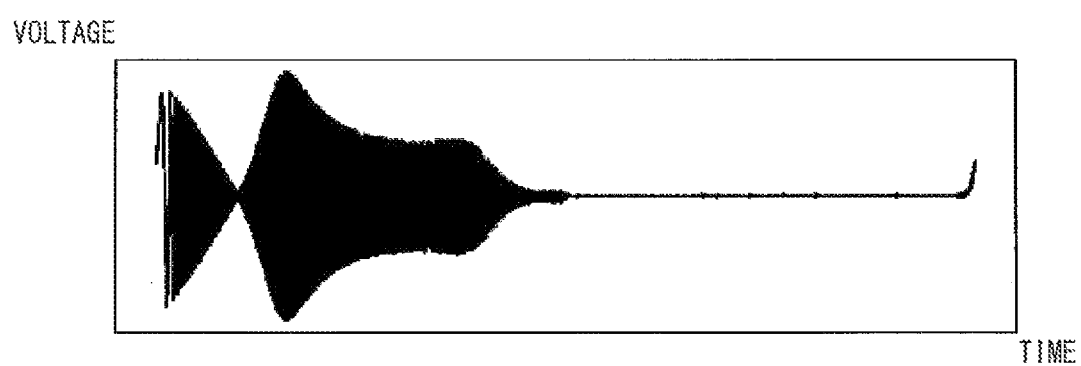
FIG. 13 shows an example of a response signal measured by a signal measurement unit according to the first embodiment of the present disclosure.

FIG. 13 shows an example of a response signal measured by the signal measurement unit according to the first embodiment of the present disclosure. In FIG. 13, the vertical axis represents voltage, and the horizontal axis represents time.

For example, the signal measurement unit 320 measures the response signal in synchronization with the signal output unit 210, by using the timing notified from the signal output unit 210.

More specifically, upon receiving a synchronization signal from the signal output unit 210 in the signal output device 200 via the transmission line 15, the signal measurement unit 320 starts the measurement period Tm. Specifically, in the measurement period Tm, the signal measurement unit 320 measures the response signal in the transmission line 13 by sampling a voltage of the transmission line 13 according to a predetermined sampling cycle. The length of the measurement period Tm is equal to the length of the output period Tout, for example.

The signal measurement unit 320 generates sampling data S by sampling the voltage of the transmission line 13 in the measurement period Tm, and outputs the generated sampling data S to the calculation unit 330.

[Calculation Unit]

The calculation unit 330 calculates an impulse response h(t) of the transmission line 13, based on a measurement result of the response signal by the signal measurement unit 320. For example, the calculation unit 330 calculates the impulse response h(t) of the transmission line 13, based on the measurement result of the response signal by the signal measurement unit 320 and on inverse characteristics of temporal change in the measurement signal.

Figure 14:
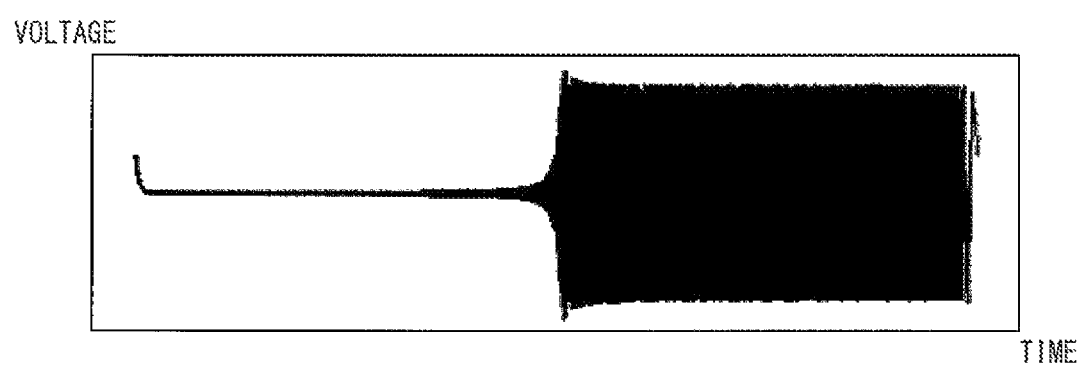
FIG. 14 shows an example of a signal having inverse characteristics of the measurement signal outputted from the signal measurement unit according to the first embodiment of the present disclosure.

FIG. 14 shows an example of a signal having inverse characteristics of the measurement signal outputted from the signal measurement unit according to the first embodiment of the present disclosure. In FIG. 14, the vertical axis represents voltage, and the horizontal axis represents time. FIG. 14 shows a signal having inverse characteristics of temporal change in a TSP signal.

For example, the storage unit 350 stores therein inverse characteristic data that is digital data of a signal S^(−1)(t) having inverse characteristics of temporal change in the TSP signal outputted from the signal output unit 210 in the signal output device 200 to the transmission line 13. "S^(−1)" means S to the power of (−1).

Upon receiving the sampling data S from the signal measurement unit 320 for each measurement period Tm, the calculation unit 330 acquires the inverse characteristic data stored in the storage unit 350, and performs convolution of the sampling data S and the inverse characteristic data, thereby calculating an impulse response h(t) indicating an output to be obtained when an impulse signal is inputted to the transmission line 13.

Figure 15:
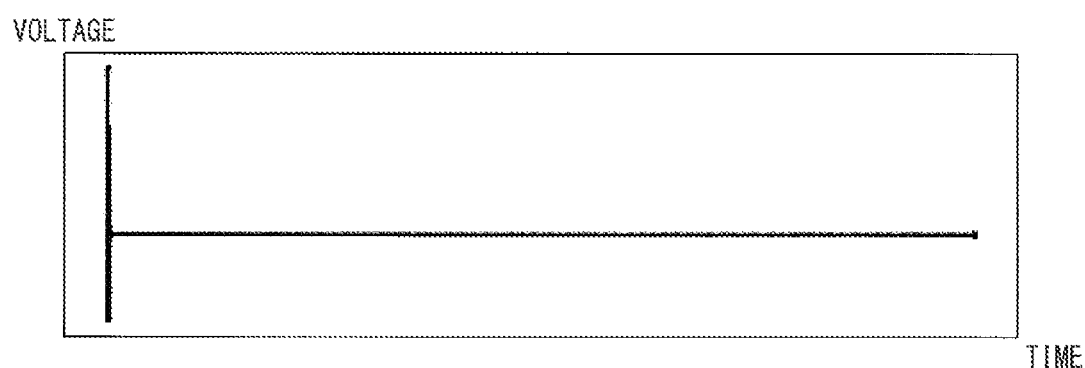
FIG. 15 shows an example of an impulse response calculated by a calculation unit according to the first embodiment of the present disclosure.

FIG. 15 shows an example of the impulse response calculated by the calculation unit according to the first embodiment of the present disclosure. In FIG. 15, the vertical axis represents voltage, and the horizontal axis represents time.

The calculation unit 330 calculates an impulse response h(t) of the transmission line 13 for each measurement period Tm, and outputs calculation information including the calculated impulse response h(t), to the detection unit 340.

[Detection Unit]

The detection unit 340 detects abnormality regarding the transmission line 13, based on the impulse response h(t) calculated by the calculation unit 330.

For example, the detection unit 340 detects, as abnormality regarding the transmission line 13, connection of new equipment to the transmission line 13. More specifically, for example, the detection unit 340 detects, as abnormality regarding the transmission line 13, connection of new equipment to a connector 33 in the transmission line 13, or connection of a new connector and new equipment to the transmission line 13.

Detection Example 1

The detection unit 340 detects abnormality regarding the transmission line 13, based on a result of comparison between a frequency characteristic H(f) of the impulse response h(t) and a frequency characteristic H(f) of an impulse response h(t) based on a past measurement result of a response signal measured by the signal measurement unit 320.

More specifically, upon receiving the calculation information from the calculation unit 330 for each measurement period Tm, the detection unit 340 subjects the impulse response h(t) included in the received calculation information to Fourier transform, thereby generating a frequency characteristic H(f) of the impulse response h(t).

The detection unit 340 generates a frequency characteristic H(f) for each measurement period Tm, and stores the generated frequency characteristic H(f) in the storage unit 350. The detection unit 340 detects abnormality regarding the transmission line 13, based on a time-sequential change in the frequency characteristic H(f) for each measurement period Tm.

Figure 16:
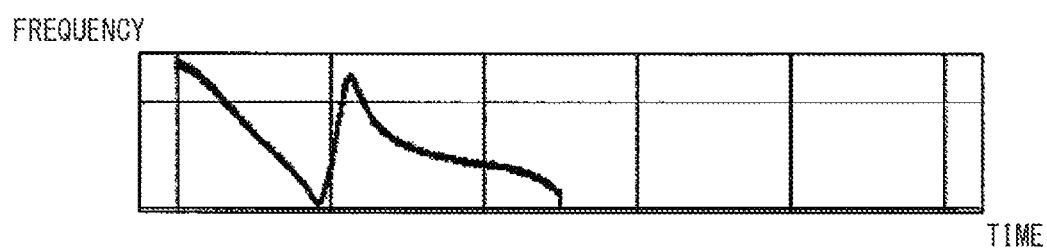
FIG. 16 shows an example of frequency characteristics calculated by a detection unit according to the first embodiment of the present disclosure.

FIG. 16 shows an example of the frequency characteristic calculated by the detection unit according to the first embodiment of the present disclosure.

Figure 17:
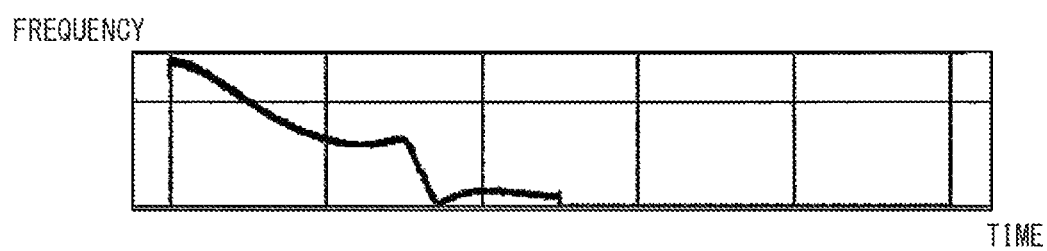
FIG. 17 shows another example of the frequency characteristics calculated by the detection unit according to the first embodiment of the present disclosure.

FIG. 17 shows another example of the frequency characteristic calculated by the detection unit according to the first embodiment of the present disclosure.

In FIG. 16 and FIG. 17, the vertical axis represents frequency, and the horizontal axis represents time. FIG. 16 shows a frequency characteristic H(f) corresponding to a measurement period Tm that starts from certain time ta, and FIG. 17 shows a frequency characteristic H(f) corresponding to a measurement period Tm that starts from time tb after the time ta.

The detection unit 340, which has generated the frequency characteristic H(f), calculates a change amount of the frequency characteristic H(f) per unit time, based on one or a plurality of frequency characteristic H(f) generated in the past and stored in the storage unit 350, and compares the calculated change amount with a predetermined threshold Th1. Then, if the change amount of the frequency characteristic H(f) per unit time is equal to or greater than the predetermined threshold Th1, the detection unit 340 determines that abnormality regarding the transmission line 13 has occurred.

For example, there is a possibility that unauthorized equipment is connected to the connector 33 which is an auxiliary connector. The response signal measured by the signal measurement unit 320 and the frequency characteristic H(f) generated by the detection unit 340 are changed when unauthorized equipment is connected to the connector 33. Therefore, the detection unit 340 can detect that unauthorized equipment is connected to the connector 33, based on a time-sequential change in the frequency characteristic H(f) for each measurement period Tm.

Meanwhile, for example, there is a possibility that a new connector and unauthorized equipment are connected to the transmission line 13. The response signal measured by the signal measurement unit 320 and the frequency characteristic H(f) generated by the detection unit 340 are changed when a new connector and unauthorized equipment are connected to the transmission line 13. Therefore, the detection unit 340 can detect that a new connector and unauthorized equipment are connected to the transmission line 13, based on a time-sequential change in the frequency characteristic H(f) for each measurement period Tm.

For example, the storage unit 350 stores therein a frequency characteristic Hx(f) which is a frequency characteristic H(f) in the state where equipment is connected to the connector 33. The detection unit 340, which has generated the frequency characteristic H(f), may compare the generated frequency characteristic H(f) with the frequency characteristic Hx(f) stored in the storage unit 350, and may detect abnormality regarding the transmission line 13, based on the comparison result.

Upon determining that abnormality regarding the transmission line 13 has occurred, the detection unit 340 outputs, to the communication unit 310, determination information indicating the occurrence of abnormality.

Upon receiving the determination information from the detection unit 340, the communication unit 310 generates a frame including the received determination information, and transmits the generated frame to a higher-order device inside the vehicle 1 or outside the vehicle 1 via the transmission line 13.

Detection Example 2

The detection unit 340, based on the impulse response h(t) and waveform information of a reference signal which is predetermined signal, calculates a response waveform y(t), to the reference signal, of the transmission line 13, and detects abnormality regarding the transmission line 13, based on the calculated response waveform y(t).

For example, the detection unit 340, based on the impulse response h(t) and waveform information of a pulse signal which is an example of the reference signal, calculates a response waveform y(t), to the pulse signal, of the transmission line 13.

Figure 18:
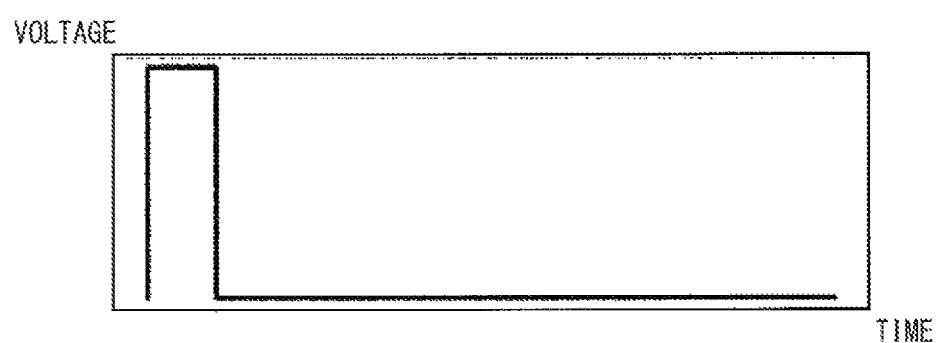
FIG. 18 shows an example of a waveform of a pulse signal used for calculation of a response waveform by the detection unit according to the first embodiment of the present disclosure.

FIG. 18 shows an example of a waveform of a pulse signal used for calculation of a response waveform by the detection unit according to the first embodiment of the present disclosure. In FIG. 18, the vertical axis represents voltage, and the horizontal axis represents time.

For example, the storage unit 350 stores therein pulse data which is digital data of the pulse signal.

Upon receiving the calculation information from the calculation unit 330 for each measurement period Tm, the detection unit 340 acquires the pulse data from the storage unit 350, and performs convolution of the pulse data and the impulse response h(t) included in the received calculation information, thereby calculating a response waveform y(t), to the pulse signal, of the transmission line 13. For example, the response waveform y(t) indicates an output obtained when the pulse signal is inputted to the transmission line 13.

Figure 19:
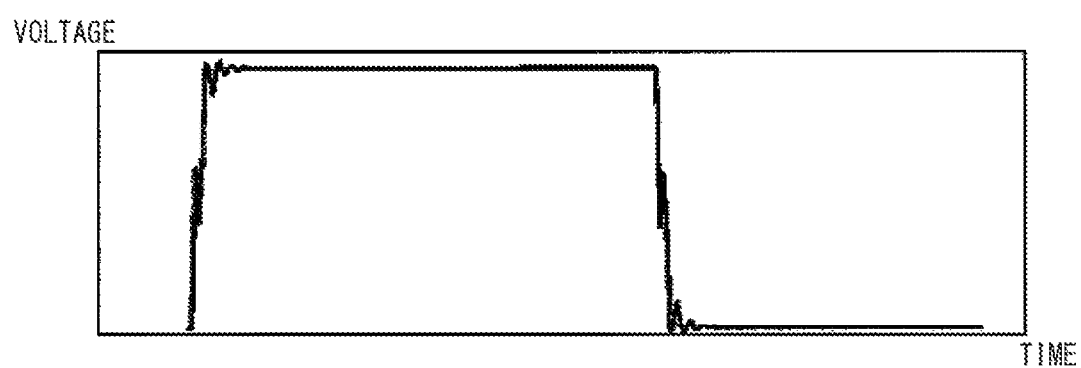
FIG. 19 shows an example of a response waveform calculated by the detection unit according to the first embodiment of the present disclosure.

FIG. 19 shows an example of a response waveform calculated by the detection unit according to the first embodiment of the present disclosure. In FIG. 19, the vertical axis represents voltage, and the horizontal axis represents time.

For example, the storage unit 350 stores therein a reference waveform yref(t) which is a response waveform y(t) for reference. For example, the reference waveform yref(t) is a response waveform y(t) calculated by the detection unit 340 in the state where abnormality regarding the transmission line 13 has not occurred. The reference waveform yref(t) is stored in the storage unit 350 by a manufacturer of the vehicle 1 before shipment of the vehicle 1.

The detection unit 340, which has generated the response waveform y(t) for each measurement period Tm, compares the generated response waveform y(t) with the reference waveform yref(t), and detects abnormality regarding the transmission line 13, based on the comparison result.

Figure 20:
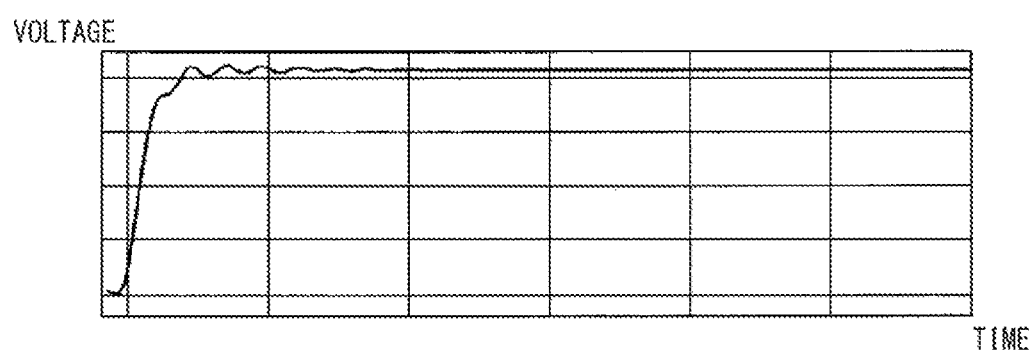
FIG. 20 shows an example of a reference waveform stored in a storage unit according to the first embodiment of the present disclosure.

FIG. 20 shows an example of a reference waveform stored in the storage unit according to the first embodiment of the present disclosure. In FIG. 20, the vertical axis represents voltage, and the horizontal axis represents time.

Figure 21:
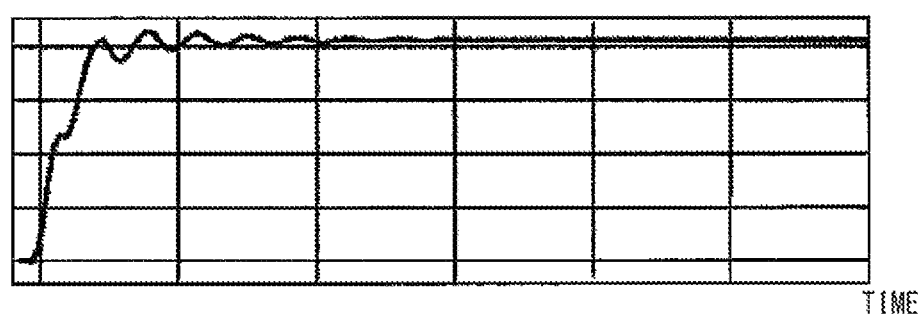
FIG. 21 shows an example of the response waveform calculated by the detection unit according to the first embodiment of the present disclosure.

FIG. 21 shows an example of a response waveform calculated by the detection unit according to the first embodiment of the present disclosure. In FIG. 21, the vertical axis represents voltage, and the horizontal axis represents time.

For example, the detection unit 340 calculates a difference waveform D(t) which is difference between the response waveform y(t) and the reference waveform yref(t). The detection unit 340 compares the calculated difference waveform D(t) with predetermined thresholds Tha, Thb, and detects abnormality regarding the transmission line 13, based on the comparison result. The threshold Tha is larger than the threshold Thb.

Figure 22:
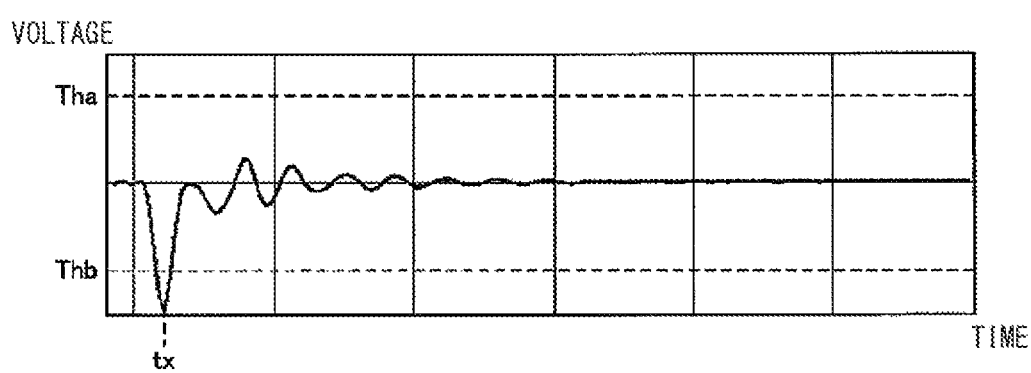
FIG. 22 shows an example of a difference waveform calculated by the detection unit according to the first embodiment of the present disclosure.

FIG. 22 shows an example of a difference waveform calculated by the detection unit according to the first embodiment of the present disclosure. In FIG. 22, the vertical axis represents voltage, and the horizontal axis represents time.

With reference to FIG. 22, upon detecting that the voltage of the difference waveform D(t) at a certain time tx is lower than the threshold Thb, the detection unit 340 determines that abnormality regarding the transmission line 13 has occurred.

For example, the response signal measured by the signal measurement unit 320 and the difference waveform D(t) calculated by the detection unit 340 are changed when unauthorized equipment is connected to the connector 33. Therefore, the detection unit 340 can detect that unauthorized equipment is connected to the connector 33, based on the result of comparison between the difference waveform D(t) and the thresholds Tha, Thb.

Moreover, for example, the response signal measured by the signal measurement unit 320 and the difference waveform D(t) calculated by the detection unit 340 are changed when a new connector and unauthorized equipment are connected to the transmission line 13. Therefore, the detection unit 340 can detect that a new connector and unauthorized equipment are connected to the transmission line 13, based on the result of comparison between the difference waveform D(t) and the thresholds Tha, Thb.

For example, the storage unit 350 stores therein a difference waveform Dx(t) which is a difference waveform D(t) in the state where equipment is connected to the connector 33. The detection unit 340, which has calculated the difference waveform D(t), may compare the calculated difference waveform D(t) with the difference waveform Dx(t) stored in the storage unit 350, and may detect abnormality regarding the transmission line 13, based on the comparison result.

The detection unit 340 may store the generated response waveform y(t) in the storage unit 350, and may detect abnormality regarding the transmission line 13, based on a time-sequential change in the response waveform y(t) for each measurement period Tm.

For example, the detection unit 340 specifies an abnormality occurrence position in the transmission line 13, based on the calculated response waveform y(t).

More specifically, the detection unit 340 specifies an abnormality occurrence position in the transmission line 13, based on a time at which the difference waveform D(t) exceeds the threshold Tha and a time at which the difference waveform D(t) becomes smaller than the threshold Thb. For example, the detection unit 340 specifies the abnormality occurrence position in the transmission line 13, based on the time tx shown in FIG. 22. Specifically, the detection unit 340 specifies the abnormality occurrence position by calculating a distance, in the transmission line 13, from the signal output device 200 to the abnormality occurrence position, according to the time tx.

Upon determining that abnormality regarding the transmission line 13 has occurred, the detection unit 340 transmits determination information indicating the occurrence of abnormality and the abnormality occurrence position to a higher-order device inside the vehicle 1 or outside the vehicle 1 via the communication unit 310 and the transmission line 13.

The detection unit 340 may not necessarily perform at least one of the detection process of detection example 1 and the detection process of detection example 2 described above, or may perform a detection process other than the detection processes of detection examples 1 and 2.

[Operation Flow]

Each device in the detection system according to the embodiment of the present disclosure includes a computer that includes a memory. An arithmetic processing unit such as a CPU in the computer reads out a program including a part or all of steps of the flowchart and sequence described below from the memory, and executes the program. The programs for the plurality of devices can be installed from outside, respectively. The programs for the plurality of devices are each distributed in a state of being stored in a storage medium.

Figure 23:
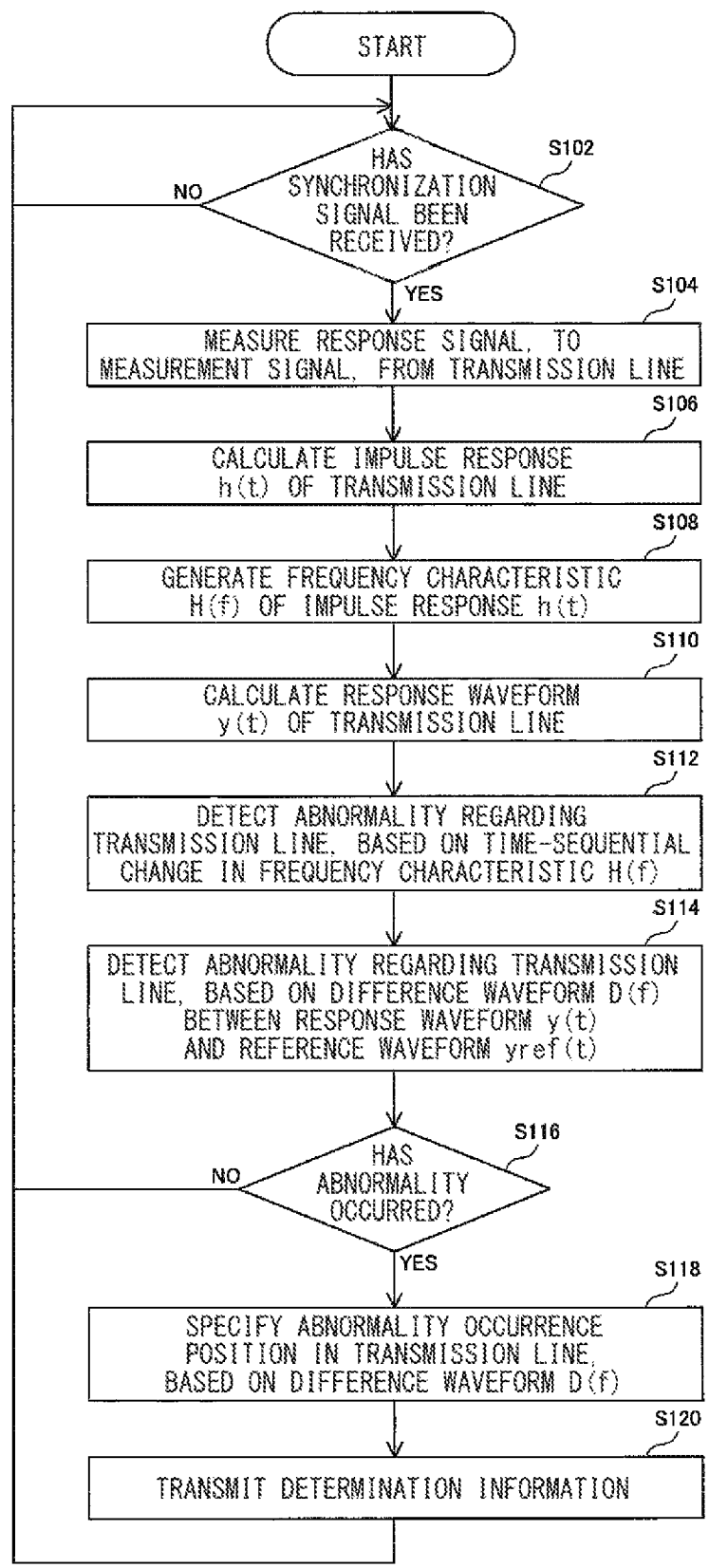
FIG. 23 is a flowchart describing an example of an operation procedure when the detection device according to the first embodiment of the present disclosure detects abnormality regarding the transmission line.

FIG. 23 is a flowchart describing an example of an operation procedure when the detection device according to the first embodiment of the present disclosure detects abnormality regarding the transmission line.

With reference to FIG. 23, first, the detection device 300 waits for a synchronization signal from the signal output unit 210 in the signal output device 200 (NO in step S102). Upon receiving a synchronization signal (YES in step S102), the detection device 300 measures, in the measurement period Tm, a response signal, to a measurement signal, from the transmission line 13 (step S104).

Next, the detection device 300 calculates an impulse response h(t) of the transmission line 13, based on the measurement result of the response signal and on inverse characteristics of temporal change in the measurement signal (step S106).

Next, the detection device 300 subjects the impulse response h(t) to Fourier transform to generate a frequency characteristic H(f) of the impulse response h(t), and stores the generated frequency characteristic H(f) in the storage unit 350 (step S108).

Next, the detection device 300 performs convolution of the impulse response h(t) and the pulse data, thereby calculating a response waveform y(t), to the pulse signal, of the transmission line 13 (step S110).

Next, the detection device 300 detects abnormality regarding the transmission line 13, based on a time-sequential change in the frequency characteristic H(f) for each measurement period Tm stored in the storage unit 350 (step S112).

Next, the detection device 300 detects abnormality regarding the transmission line 13, based on a difference waveform D(f) between the response waveform y(t) and the reference waveform yref(t) (step S114).

Next, upon determining that abnormality regarding the transmission line 13 has not occurred (NO in step S116), the detection device 300 waits for a new synchronization signal from the signal output unit 210 in the signal output device 200 (NO in step S102).

Meanwhile, upon determining that abnormality regarding the transmission line 13 has occurred (YES in step S116), the detection device 300 specifies an abnormality occurrence position in the transmission line 13, based on the difference waveform D(f) (step S118).

Next, the detection device 300 transmits determination information indicating the occurrence of abnormality in the transmission line 13 and the abnormality occurrence position, to a higher-order device inside the vehicle 1 or outside the vehicle 1 via the transmission line 13 (step S120).

Next, the detection device 300 waits for a new synchronization signal from the signal output unit 210 in the signal output device 200 (NO in step S102).

The detection device 300 may not necessarily perform at least steps S108, S112 or steps S110, S114. The detection device 300 may not necessarily perform at least one of step S118 and step S120.

Figure 24:
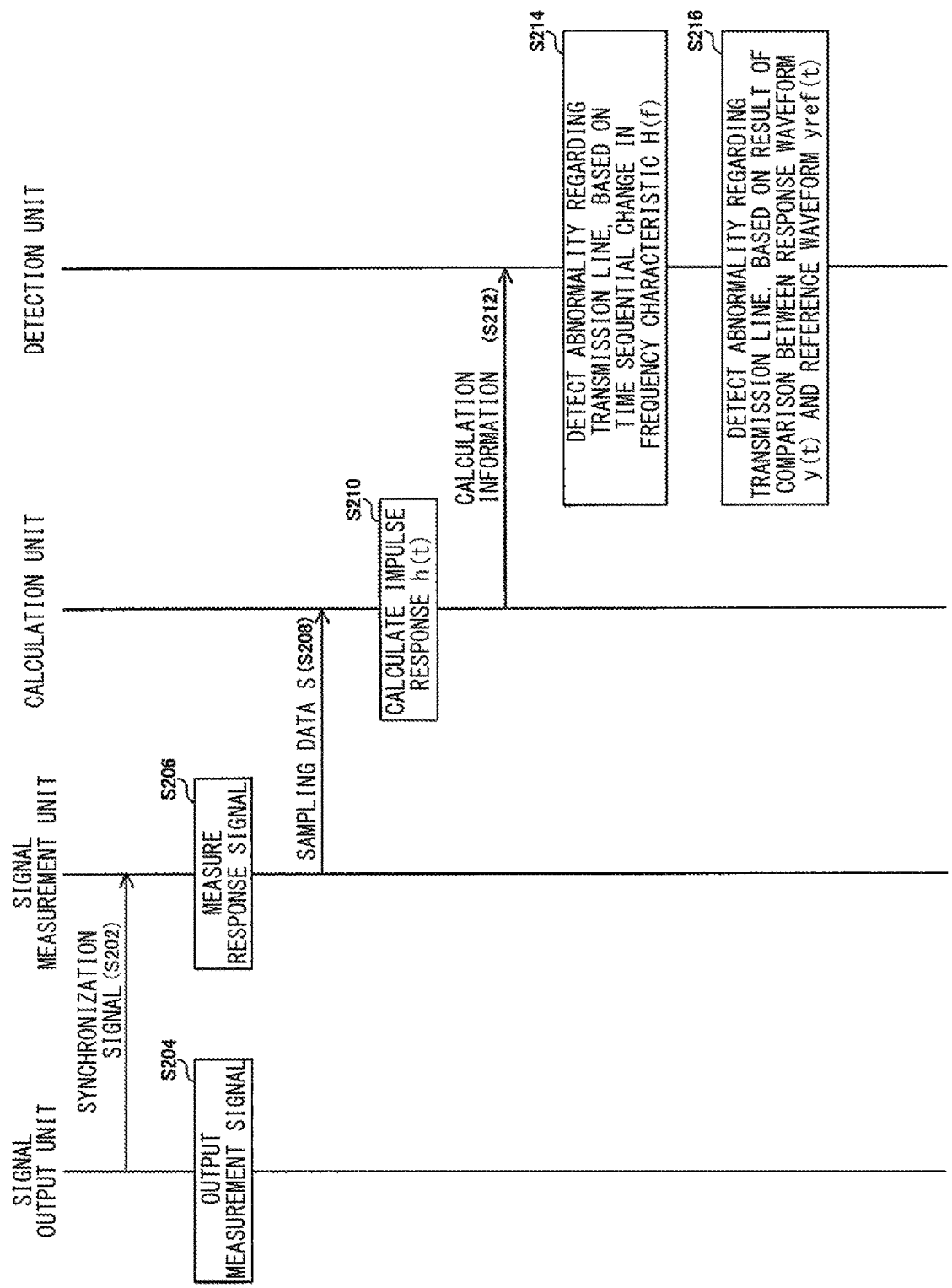
FIG. 24 shows an example of a sequence of an abnormality detection process in a detection system according to the first embodiment of the present disclosure.

FIG. 24 shows an example of a sequence of an abnormality detection process in the detection system according to the first embodiment of the present disclosure.

With reference to FIG. 24, first, the signal output unit 210 in the signal output device 200 transmits a synchronization signal, which indicates a timing to start output of a measurement signal, to the signal measurement unit 320 in the detection device 300 via the transmission line 15 (step S202).

Next, in the output period Tout, the signal output unit 210 outputs the measurement signal to the transmission line 13 (step S204).

Next, upon receiving the synchronization signal from the signal output unit 210, the signal measurement unit 320 measures, in the measurement period Tm, a response signal in the transmission line 13 (step S206).

Next, the signal measurement unit 320 outputs sampling data S of the voltage of the transmission line 13, as a measurement result of the response signal to the calculation unit 330 (step S208).

Next, the calculation unit 330 calculates an impulse response h(t) of the transmission line 13 by performing convolution of the sampling data S received from the signal measurement unit 320 and the inverse characteristic data (step S210).

Next, the calculation unit 330 outputs calculation information including the calculated impulse response h(t) to the detection unit 340 (step S212).

Next, the detection unit 340 detects abnormality regarding the transmission line 13, based on the impulse response h(t) included in the calculation information received from the calculation unit 330.

More specifically, the detection unit 340 subjects the impulse response h(t) to Fourier transform to generate a frequency characteristic H(f) of the impulse response h(t), and detects abnormality regarding the transmission line 13, based on a time-sequential change in the frequency characteristic H(f) (step S214).

Moreover, the detection unit 340 calculates a response waveform y(t), to a pulse signal, of the transmission line 13, based on the impulse response h(t) and waveform information of the pulse signal, and detects abnormality regarding the transmission line 13, based on a result of comparison between the generated response waveform y(t) and the reference waveform yref(t) (step S216).

The detection system 401 may not necessarily perform at least one of step S214 and step S216.

In the detection system 401 according to the first embodiment of the present disclosure, the signal output device 200 is a device separate from the control device 101 and the gateway device 20. However, the present disclosure is not limited thereto. The signal output device 200 may be included in the control device 101 or the gateway device 20.

In the detection system 401 according to the first embodiment of the present disclosure, the detection device 300 is a device separate from the control device 101 and the gateway device 20. However, the present disclosure is not limited thereto. The detection device 300 may be included in the control device 101 or the gateway device 20.

In the detection system 401 according to the first embodiment of the present disclosure, the signal output device 200 and the detection device 300 are connected to each other via the transmission line 15. However, the present disclosure is not limited thereto. The transmission line 15 may not necessarily be provided in the in-vehicle device group 40. In this case, the signal output unit 210 transmits the synchronization signal, which indicates the timing to start output of the measurement signal, to the detection device 300 via the transmission line 13, for example.

In the detection system 401 according to the first embodiment of the present disclosure, the detection device 300 is provided with the calculation unit 330 and the detection unit 340. However, the present disclosure is not limited thereto. The detection device 300 may not necessarily include at least one of the calculation unit 330 and the detection unit 340. In this case, at least one of the calculation unit 330 and the detection unit 340 may be provided in a server outside the vehicle 1. For example, the calculation unit 330 provided in the server outside the vehicle 1 acquires a measurement result of the signal measurement unit 320 via the gateway device 20 and the in-vehicle communication device 30. A part or the entirety of the functions of the calculation unit 330 and the detection unit 340 may be provided through cloud computing. That is, the calculation unit 330 and the detection unit 340 may be constituted by a plurality of cloud servers or the like.

In the detection system 401 according to the first embodiment of the present disclosure, the detection unit 340 detects abnormality regarding the transmission line 13, based on the result of comparison between the difference waveform D(t) and the thresholds Tha, Thb, and specifies an abnormality occurrence position in the transmission line 13. However, the present disclosure is not limited thereto. The detection unit 340 may not necessarily specify an abnormality occurrence position in the transmission line 13 while detecting abnormality regarding the transmission line 13.

In the detection system 401 according to the first embodiment of the present disclosure, the signal output unit 210 transmits the synchronization signal to the signal measurement unit 320 via the transmission line 15. However, the present disclosure is not limited thereto. The signal output unit 210 may not necessarily transmit the synchronization signal to the signal measurement unit 320. For example, the signal measurement unit 320 may start measurement of the response signal from the transmission line 13, in a predetermined cycle.

In the detection system 401 according to the first embodiment of the present disclosure, the detection unit 340 detects, as abnormality regarding the transmission line 13, connection of new equipment to the transmission line 13. However, the present disclosure is not limited thereto. The detection unit 340 may detect physical abnormality in the transmission line 13, as abnormality regarding the transmission line 13.

In the detection system 401 according to the first embodiment of the present disclosure, the signal output unit 210 outputs, to the transmission line 13, the measurement signal whose frequency exhibits a predetermined temporal change. However, the present disclosure is not limited thereto. The signal output unit 210 may output, to the transmission line 13, a measurement signal, such as an M-sequence signal, whose voltage exhibits a predetermined temporal change. In this case, the calculation unit 330 calculates an impulse response h(t) of the transmission line 13, based on a measurement result of a response signal measured by the signal measurement unit 320 and on inverse characteristics of time waveform of the M-sequence signal. However, when a measurement signal, such as a TSP signal, whose frequency exhibits a predetermined temporal change is used, abnormality regarding the transmission line 13 can be more accurately detected by using devices such as a digital-analog conversion circuit and an analog-digital conversion circuit which are limited in performance, as compared to the case of using the M-sequence signal as a measurement signal.

Incidentally, there is a demand for a technology that can realize an excellent function regarding security in the network.

For example, conventionally, a technology for detecting characteristics of a measurement target such as a transmission line by using TDR has been known. In a case where change in characteristics of a measurement target is detected by using the technology and abnormality regarding the measurement target is detected based on the detection result, in order to accurately detect change in characteristics of the measurement target, a rising pulse needs to be outputted with high reproducibility to the measurement target, and consequently, a high-performance pulse signal generator is required.

In a case where characteristics such as S parameters of a measurement target are measured by using a network analyzer and abnormality regarding the measurement target is detected based on the measurement result, an expensive and complex measurement instrument needs to be used to secure sufficient detection precision, and moreover, a measurement instrument needs to be calibrated for each measurement.

Meanwhile, a technology for measuring an impulse response of a measurement target by using an M-sequence signal has been used in the field of acoustics, for example. However, since the M-sequence signal has a relatively high crest factor, if measurement of the impulse response of the measurement target is attempted by outputting the M-sequence signal to the measurement target, high-performance digital-analog conversion circuit and analog-digital conversion circuit need to be used.

In contrast to the above conventional technologies, in the detection system 401 according to the first embodiment of the present disclosure, the signal output unit 210 outputs, to the transmission line 13, a measurement signal that exhibits a predetermined temporal change. The signal measurement unit 320 measures a response signal, to the measurement signal, from the transmission line 13. The calculation unit 330, based on the measurement result of the response signal measured by the signal measurement unit 320, calculates an impulse response of the transmission line 13. The detection unit 340, based on the impulse response calculated by the calculation unit 330, detects abnormality regarding the transmission line 13.

A detection method according to the first embodiment of the present disclosure is a detection method used in the detection system 401. In this detection method, first, the detection system 401 outputs, to the transmission line 13, a measurement signal that exhibits a predetermined temporal change. Next, the detection system 401 measures a response signal, to the measurement signal, from the transmission line 13. Next, the detection system 401 calculates an impulse response of the transmission line 13, based on the measurement result of the response signal. Next, the detection system 401 detects abnormality regarding the transmission line 13, based on the calculated impulse response.

In the above configuration and method, the measurement signal that exhibits a predetermined temporal change is outputted to the transmission line 13, and the impulse response of the transmission line 13 is calculated based on the response signal from the transmission line 13. Therefore, calculation of the impulse response and detection of abnormality can be performed with a simpler configuration as compared to the configuration using a TDR and a network analyzer, for example. Moreover, since the response signal can be measured at a higher SN ratio as compared to the configuration using a network analyzer, for example, calibration of a measurement instrument or the like can be facilitated. Moreover, the response signal can be measured at a higher SN ratio as compared to the configuration using an impulse signal as a measurement signal, for example. As a result, abnormality regarding the transmission line 13 can be more accurately detected with high reproducibility while separating non-linear noise.

Therefore, in the detection system and the detection method according to the first embodiment of the present disclosure, it is possible to realize an excellent function regarding security in the network.

Next, another embodiment of the present disclosure will be described with reference to the drawings. In the drawings, the same or corresponding parts are denoted by the same reference signs, and descriptions thereof are not repeated.

Second Embodiment

In contrast to the detection system 401 according to the first embodiment, this second embodiment relates to a detection system 402 that detects abnormality regarding the transmission line 13, based on reflection characteristics of the transmission line 13. The detection system 402 is identical to the detection system 401 of the first embodiment except for the content described below.

Figure 25:
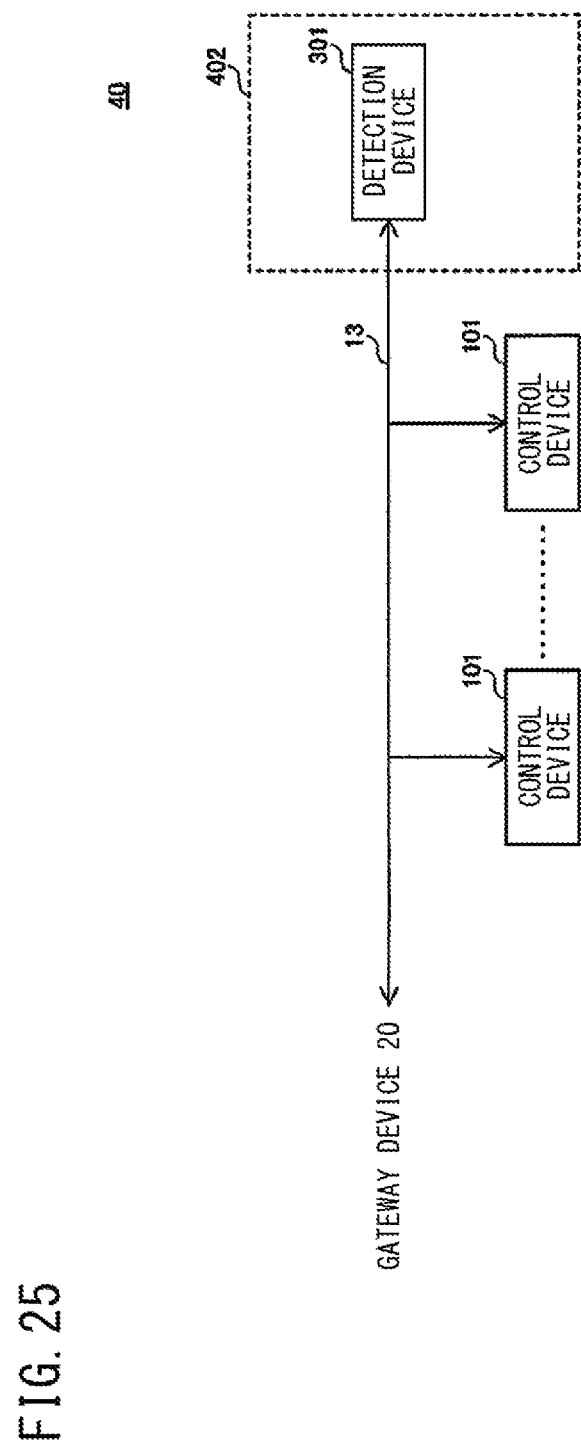
FIG. 25 shows a configuration of an in-vehicle device group according to a second embodiment of the present disclosure.

FIG. 25 shows a configuration of an in-vehicle device group according to the second embodiment of the present disclosure.

With reference to FIG. 25, the detection system 402 in the in-vehicle device group 40 includes a detection device 301. The detection device 301 is connected to the transmission line 13. More specifically, for example, the detection device 301 is connected to an end, of the transmission line 13, on a side opposite to the gateway device 20.

Figure 26:
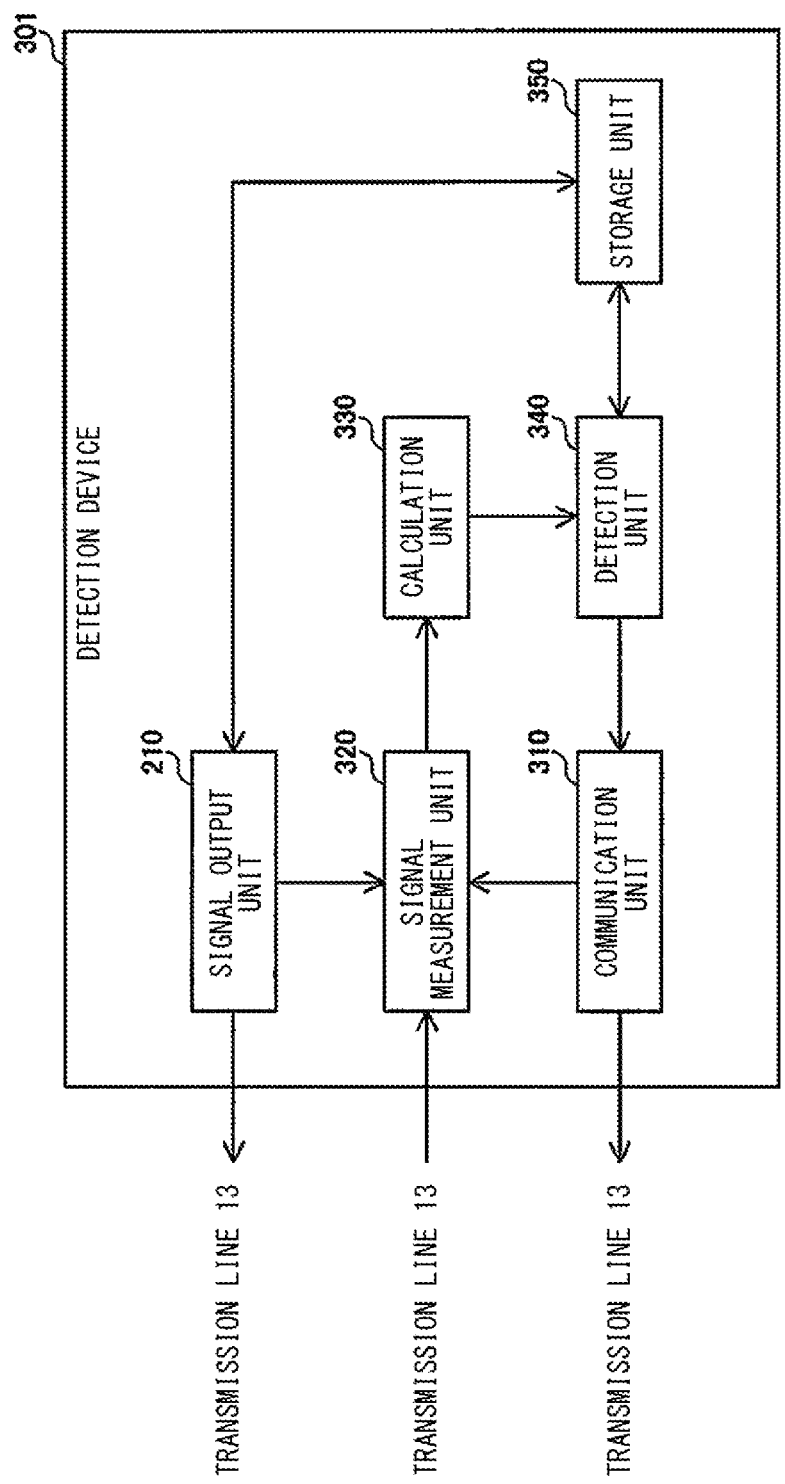
FIG. 26 shows a configuration of a detection device according to the second embodiment of the present disclosure.

FIG. 26 shows a configuration of a detection device according to the second embodiment of the present disclosure.

With reference to FIG. 26, the detection device 301 includes a signal output unit 210, a communication unit 310, a signal measurement unit 320, a calculation unit 330, a detection unit 340, and a storage unit 350.

For example, the signal output unit 210 starts an output period Tout at an output timing according to a predetermined cycle. In the output period Tout, the signal output unit 210 outputs a measurement signal that exhibits a predetermined temporal change, to the transmission line 13. For example, the signal output unit 210 outputs, to the signal measurement unit 320, a synchronization signal indicating a timing to start output of the measurement signal.

The signal measurement unit 320 measures a response signal, to the measurement signal, from the transmission line 13. For example, the signal measurement unit 320 measures a response signal indicating reflection characteristics of the transmission line 13. Specifically, in a measurement period Tm, the signal measurement unit 320 measures, as a response signal, a TSP signal that has been outputted to the transmission line 13 by the signal output unit 210 in the signal output device 200 and reflected by the transmission line 13.

For example, upon receiving the synchronization signal from the signal output unit 210, the signal measurement unit 320 starts the measurement period Tm. Specifically, in the measurement period Tm, the signal measurement unit 320 measures the response signal in the transmission line 13 by sampling the voltage of the transmission line 13 according to a predetermined sampling cycle.

The signal measurement unit 320 generates sampling data S by sampling the voltage of the transmission line 13 during the measurement period Tm, and outputs the generated sampling data S to the calculation unit 330.

The calculation unit 330 calculates an impulse response h(t) of the transmission line 13, based on the measurement result of the response signal measured by the signal measurement unit 320 and on inverse characteristics of temporal change in the measurement signal.

The calculation unit 330 calculates an impulse response h(t) of the transmission line 13 for each measurement period Tm, and outputs calculation information including the calculated impulse response h(t) to the detection unit 340.

The detection unit 340 detects abnormality regarding the transmission line 13, based on the impulse response h(t) calculated by the calculation unit 330. Specifically, the detection unit 340 performs the detection process of detection example 1 and the detection process of the detection example 2 described above. The detection unit 340 may not necessarily perform at least one of the detection process of detection example 1 and the detection process of detection example 2, or may perform a detection process other than the detection processes of detection examples 1 and 2.

Figure 27:
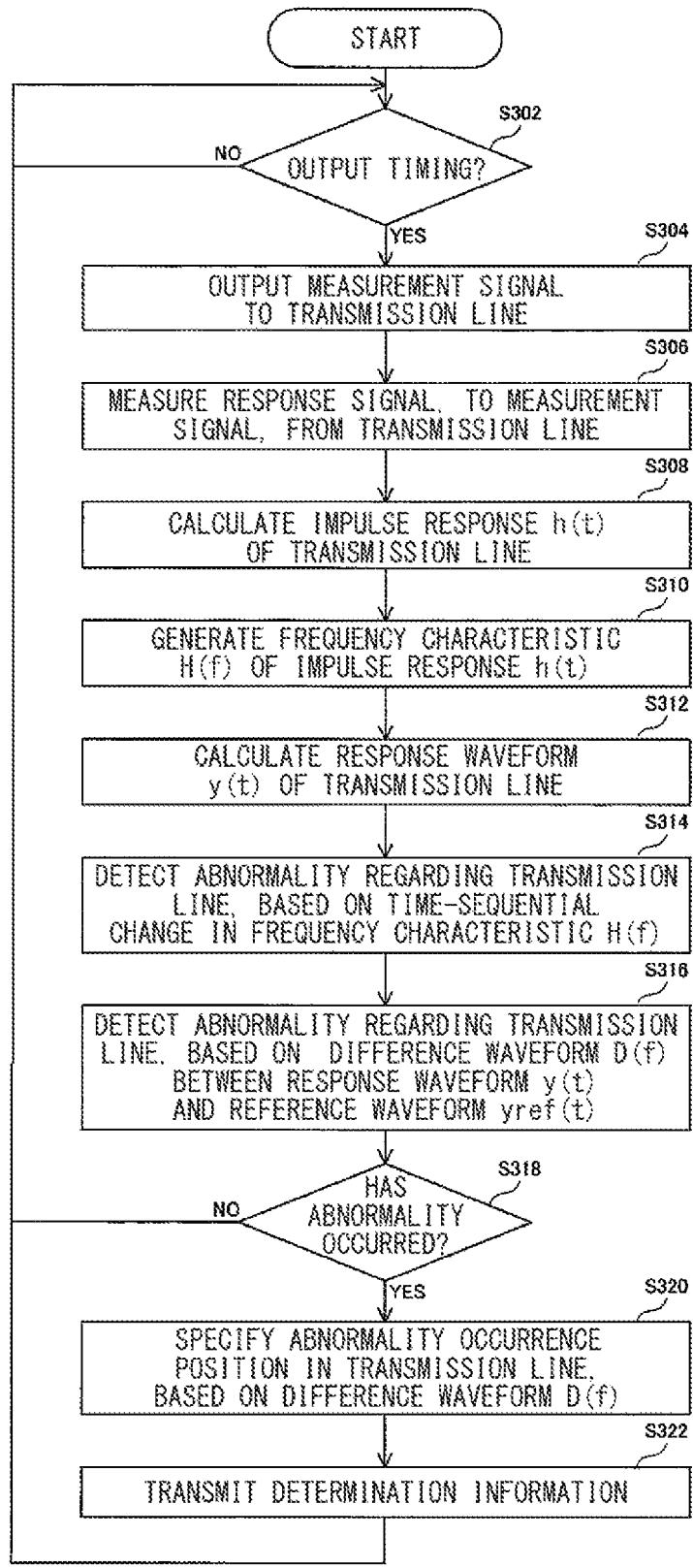
FIG. 27 is a flowchart describing an example of an operation procedure when the detection device according to the second embodiment of the present disclosure detects abnormality regarding the transmission line.

FIG. 27 is a flowchart describing an example of an operation procedure when the detection device according to the second embodiment of the present disclosure detects abnormality regarding the transmission line.

With reference to FIG. 27, first, the detection device 301 waits for an output timing according to a predetermined cycle (NO in step S302). At an output timing (YES in step S302), the detection device 301 starts an output period Tout, and outputs a measurement signal to the transmission line 13 (step S304).

Next, in a measurement period Tm starting from the output timing, the detection device 301 measures a response signal, to the measurement signal, from the transmission line 13 (step S306).

Next, the detection device 301 calculates an impulse response h(t) of the transmission line 13, based on the measurement result of the response signal and on inverse characteristics of temporal change in the measurement signal (step S308).

Next, the detection device 301 subjects the impulse response h(t) to Fourier transform to generate a frequency characteristic H(f) of the impulse response h(t), and stores the generated frequency characteristic H(f) in the storage unit 350 (step S310).

Next, the detection device 301 performs convolution of the impulse response h(t) and pulse data to calculate a response waveform y(t), to a pulse signal, of the transmission line 13 (step S312).

Next, the detection device 301 detects abnormality regarding the transmission line 13, based on a time-sequential change in the frequency characteristic H(f) for each measurement period Tm stored in the storage unit 350 (step S314).

Next, the detection device 301 detects abnormality regarding the transmission line 13, based on a difference waveform D(f) which is a difference between the response waveform y(t) and a reference waveform yref(t) (step S316).

Next, upon determining that abnormality regarding the transmission line 13 has not occurred (NO in step S318), the detection device 301 waits for a new output timing (NO in step S302).

Meanwhile, upon determining that abnormality regarding the transmission line 13 has occurred (YES in step S318), the detection device 301 specifies an abnormality occurrence position in the transmission line 13, based on the difference waveform D(f) (step S320).

Next, the detection device 301 transmits determination information indicating the occurrence of abnormality in the transmission line 13 and the abnormality occurrence position, to a higher-order device inside the vehicle 1 or outside the vehicle 1 via the transmission line 13 (step S322).

Next, the detection device 301 waits for a new output timing (NO in step S302).

The detection device 301 may not necessarily perform at least steps S310, S314 or steps S312, S316. The detection device 301 may not necessarily perform at least one of step S320 and step S322.

As described above, in the detection device 301 according to the second embodiment of the present disclosure, the signal output unit 210 outputs, to the transmission line 13, a measurement signal that exhibits a predetermined temporal change. The signal measurement unit 320 measures a response signal, to the measurement signal, from the transmission line 13.

In the above configuration, the measurement signal that exhibits a predetermined temporal change is transmitted to the transmission line 13, and the response signal from the transmission line 13 is measured. Therefore, for example, an impulse response of the transmission line 13 can be calculated based on the measurement result of the response signal, and abnormality regarding the transmission line 13 can be detected based on the calculated impulse response. Therefore, calculation of the impulse response and detection of abnormality can be performed with a simpler configuration as compared to the configuration using a TDR and a network analyzer, for example. Moreover, since the response signal can be measured at a higher SN ratio as compared to the configuration using a network analyzer, for example, calibration of a measurement instrument or the like can be facilitated. Moreover, the response signal can be measured at a higher SN ratio as compared to the configuration using an impulse signal as a measurement signal, for example. As a result, abnormality regarding the transmission line 13 can be more accurately detected with high reproducibility while separating non-linear noise.

Therefore, in the detection device according to the second embodiment of the present disclosure, it is possible to realize an excellent function regarding security in the network.

Next, another embodiment of the present disclosure will be described with reference to the drawings. In the drawings, the same or corresponding parts are denoted by the same reference signs, and descriptions thereof are not repeated.

Third Embodiment

In contrast to the detection systems 401, 402 according to the first and second embodiments, this third embodiment relates to a detection system 403 that detects abnormality regarding the transmission line 13, based on transmission characteristics and reflection characteristics of the transmission line 13. The detection system 403 is identical to the detection system 401 of the first embodiment and the detection system 402 of the second embodiment except for the content described below.

Figure 28:
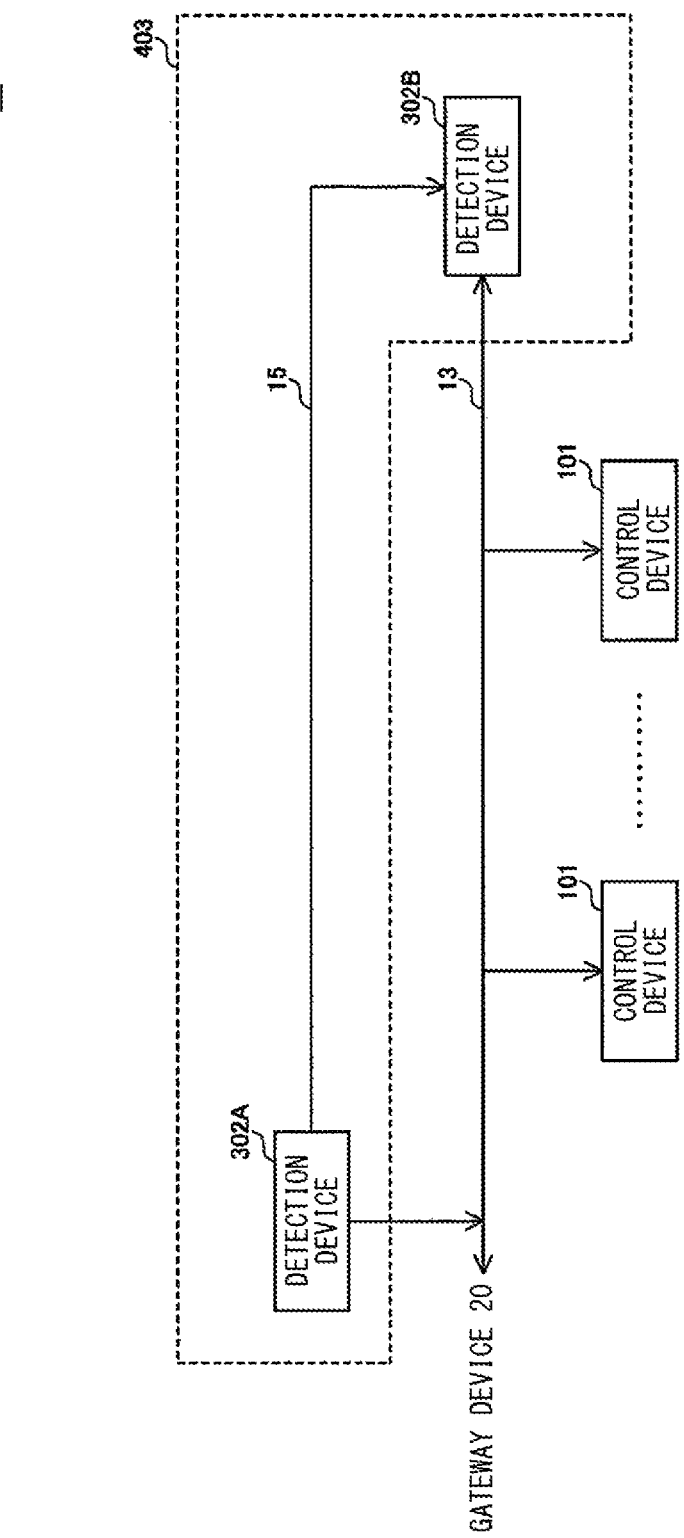
FIG. 28 shows a configuration of an in-vehicle device group according to a third embodiment of the present disclosure.

FIG. 28 shows a configuration of an in-vehicle device group according to the third embodiment of the present disclosure.

With reference to FIG. 28, the detection system 403 in the in-vehicle device group 40 includes detection devices 302. More specifically, the detection system 403 includes detection devices 302A, 302B as the detection devices 302. The detection devices 302A, 302B are connected to the transmission line 13. More specifically, for example, the detection device 302A is connected near a first end, on the gateway device 20 side, of the transmission line 13, while the detection device 300 is connected to a second end, on the side opposite to the gateway device 20, of the transmission line 13.

Figure 29:
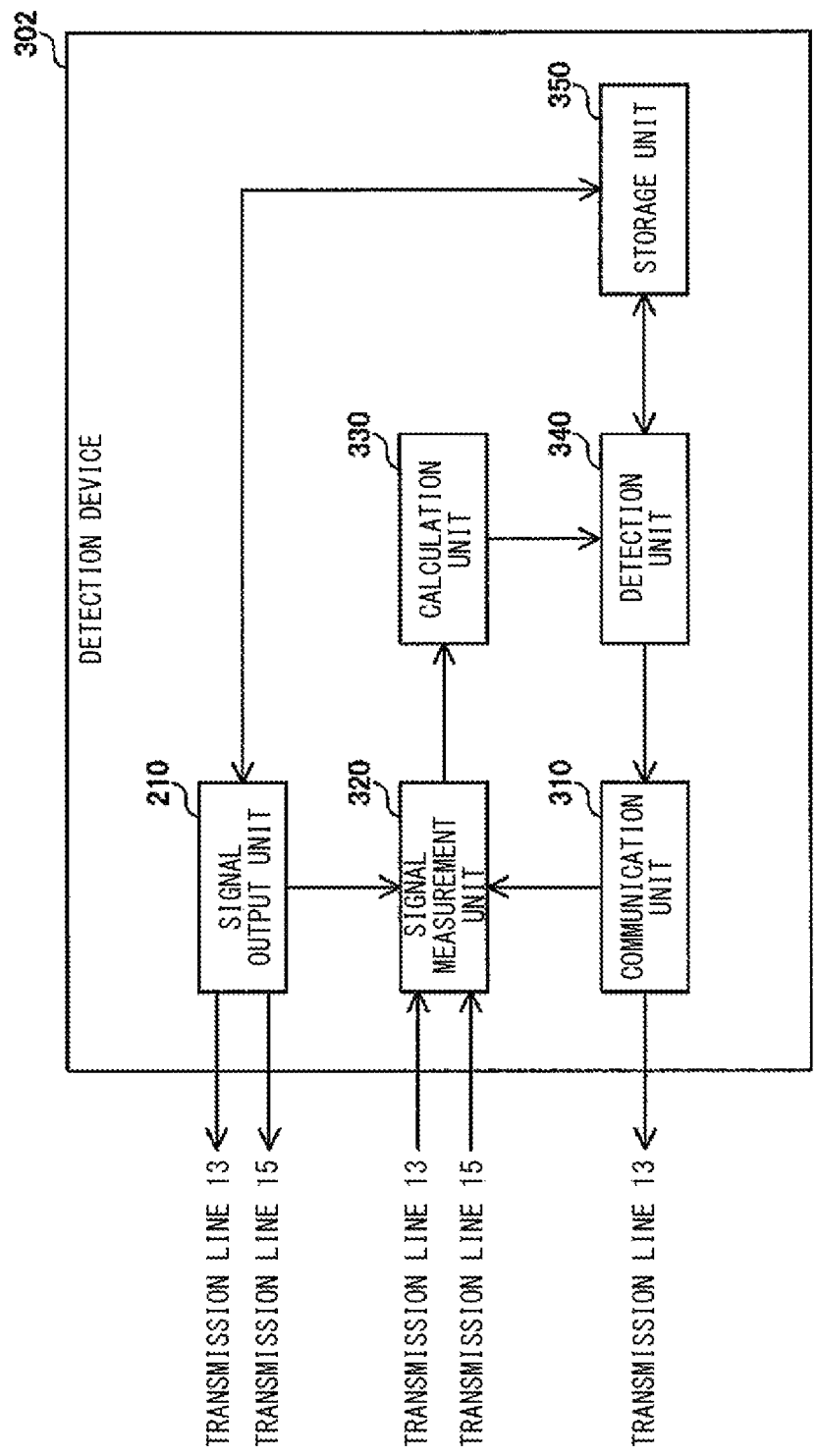
FIG. 29 shows a configuration of a detection device according to the third embodiment of the present disclosure.

FIG. 29 shows a configuration of a detection device according to the third embodiment of the present disclosure.

With reference to FIG. 29, the detection device 302 includes a signal output unit 210, a communication unit 310, a signal measurement unit 320, a calculation unit 330, a detection unit 340, and a storage unit 350.

The signal output unit 210 starts an output period Tout at an output timing according to a predetermined cycle, for example. In the output period Tout, the signal output unit 210 outputs a measurement signal that exhibits a predetermined temporal change, to the transmission line 13. For example, the signal output unit 210 outputs a synchronization signal, which indicates a timing to start output of the measurement signal, to the signal measurement unit 320 and to another detection device 302 via the transmission line 15.

In the detection system 403, for example, an output timing of each signal output unit 210 has been set in advance such that the output period Tout of the signal output unit 210 in the detection device 302A does not overlap the output period Tout of the signal output unit 210 in the detection device 302B.

The signal measurement unit 320 measures a response signal, to the measurement signal, from the transmission line 13. For example, the signal measurement unit 320 measures a response signal indicating transmission characteristics of the transmission line 13 and a response signal indicating reflection characteristics of the transmission line 13.

Specifically, in a measurement period Tmt, the signal measurement unit 320 measures, as a response signal, a TSP signal that has been outputted from a signal output unit 210 in another detection device 302 to the transmission line 13 and has been transmitted through the transmission line 13. Moreover, in a measurement period Tmr, the signal measurement unit 320 measures, as a response signal, a TSP signal that has been outputted from the signal output unit 210 in its detection device 302 to the transmission line 13 and reflected by the transmission line 13. The length of the measurement period Tmt is equal to the length of the measurement period Tmr, for example. The measurement period Tmt and the measurement period Tmr do not overlap each other.

For example, upon receiving the synchronization signal from the signal output unit 210 in another detection device 302 via the transmission line 15, the signal measurement unit 320 starts a measurement period Tmt. Specifically, in the measurement period Tmt, the signal measurement unit 320 measures a response signal in the transmission line 13 by sampling the voltage of the transmission line 13 according to a predetermined sampling cycle.

For example, the signal measurement unit 320 starts a measurement period Tmr when receiving a synchronization signal from its signal output unit 210. Specifically, in the measurement period Tmr, the signal measurement unit 320 measures a response signal in the transmission line 13 by sampling the voltage of the transmission line 13 according to the predetermined sampling cycle.

The signal measurement unit 320 generates sampling data St by sampling the voltage of the transmission line 13 in the measurement period Tmt, and outputs the generated sampling data St to the calculation unit 330. Moreover, the signal measurement unit 320 generates sampling data Sr by sampling the voltage of the transmission line 13 in the measurement period Tmr, and outputs the generated sampling data Sr to the calculation unit 330.

The calculation unit 330 calculates an impulse response h(t) of the transmission line 13, based on the measurement result of the response signal measured by the signal measurement unit 320. For example, the calculation unit 330 calculates an impulse response h(t) of the transmission line 13, based on the measurement result of the response signal measured by the signal measurement unit 320 and on inverse characteristics of temporal change in the measurement signal.

More specifically, the calculation unit 330 calculates an impulse response ht(t) of the transmission line 13 for each measurement period Tmt, and outputs calculation information including the calculated impulse response ht(t) to the detection unit 340. Moreover, the calculation unit 330 calculates an impulse response hr(t) of the transmission line 13 for each measurement period Tmr, and outputs calculation information including the calculated impulse response hr(t) to the detection unit 340.

The detection unit 340 detects abnormality regarding the transmission line 13, based on the impulse responses ht(t), hr(t) calculated by the calculation unit 330. Specifically, the detection unit 340 performs the aforementioned detection processes of detection examples 1 and 2 by using the impulse response ht(t), and performs the detection processes of detection examples 1 and 2 by using the impulse response hr(t). The detection unit 340 may not necessarily perform at least one of the detection process of detection example 1 and the detection process of detection example 2, or may perform a detection process other than the detection processes of detection examples 1 and 2.

For example, the detection unit 340 in the detection device 302A transmits detection information indicating the result of the detection process, to the detection device 302B via the communication unit 310 and the transmission line 13.

Upon receiving the detection information from the detection device 302A via the transmission line 13 and the communication unit 310, the detection unit 340 in the detection device 302B determines whether or not abnormality regarding the transmission line 13 has occurred, based on the result of the detection process indicated by the received detection information and on the result of the detection process performed by itself. For example, when at least one of the result of the detection process performed by the detection device 302A and the result of the detection process performed by itself indicates occurrence of abnormality regarding the transmission line 13, the detection unit 340 in the detection device 302B determines that abnormality regarding the transmission line 13 has occurred.

Moreover, the detection unit 340 in the detection device 302B specifies an abnormality occurrence position in the transmission line 13, based on the result of the detection process indicated by the detection information received from the detection device 302A and on the result of the detection process performed by itself. Thus, the abnormality occurrence position can be specified with high accuracy.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

A detection system comprising:

a signal output unit configured to output, to a measurement target, a measurement signal whose frequency exhibits a predetermined temporal change;

a signal measurement unit configured to measure a response signal, to the measurement signal, from the measurement target;

a calculation unit configured to calculate an impulse response of the measurement target, based on a measurement result of the response signal measured by the signal measurement unit and on inverse characteristics of temporal change in the measurement signal; and a detection unit configured to detect abnormality regarding the measurement target, based on the impulse response calculated by the calculation unit, wherein the signal output unit, the signal measurement unit, the calculation unit, and the detection unit are realized by a processor.

[Additional Note 2]

A detection system comprising:

a signal output unit configured to output, to a measurement target, a measurement signal whose frequency exhibits a predetermined temporal change;

a signal measurement unit configured to measure a response signal, to the measurement signal, from the measurement target;

a calculation unit configured to calculate an impulse response of the measurement target, based on a measurement result of the response signal measured by the signal measurement unit and on inverse characteristics of temporal change in the measurement signal; and a detection unit configured to detect abnormality regarding the measurement target, based on the impulse response calculated by the calculation unit, wherein
the signal output unit outputs a TSP signal as the measurement signal to the measurement target, and
the signal measurement unit measures, as the response signal, the TSP signal having been transmitted through the measurement target or the TSP signal having been reflected by the measurement target.

[Additional Note 3]
A detection device comprising:
a signal output unit configured to output, to a measurement target, a measurement signal whose frequency exhibits a predetermined temporal change; and
a signal measurement unit configured to measure a response signal, to the measurement signal, from the measurement target, wherein
the signal output unit and the signal measurement unit are realized by a processor.

[Additional Note 4]
A detection device comprising:
a signal output unit configured to output, to a measurement target, a measurement signal whose frequency exhibits a predetermined temporal change; and
a signal measurement unit configured to measure a response signal, to the measurement signal, from the measurement target, wherein
the signal output unit outputs a TSP signal as the measurement signal to the measurement target, and
the signal measurement unit measures, as the response signal, the TSP signal having been transmitted through the measurement target or the TSP signal having been reflected by the measurement target.

[Additional Note 5]
A detection system comprising:
a signal output unit configured to output, to a measurement target, a measurement signal that exhibits a predetermined temporal change;
a signal measurement unit configured to measure a response signal, to the measurement signal, from the measurement target;
a calculation unit configured to calculate an impulse response of the measurement target, based on a measurement result of the response signal measured by the signal measurement unit; and
a detection unit configured to detect abnormality regarding the measurement target, based on the impulse response calculated by the calculation unit, wherein
the measurement target is a bus-type transmission path having a plurality of connectors,
the transmission path includes a main line, at least one sub-line drawn out from the main line, a first connector, as one of the connectors, connected to a first end of the main line, a second connector, as one of the connectors, connected to a second end of the main line, and a third connector, as one of the connectors, connected to the sub-line,
the signal output unit is connected to the first connector,
the signal measurement unit is connected to the second connector, and
the detection unit detects, as abnormality regarding the measurement target, connection of new equipment to the measurement target.

REFERENCE SIGNS LIST 1 vehicle
12 in-vehicle network
13 transmission line
14 transmission line
15 transmission line
20 gateway device
23A, 23B, 33, 43 connector
30 in-vehicle communication device
40 in-vehicle device group
101 control device
200 signal output device
210 signal output unit
230 storage unit
300, 301, 302 detection device
310 communication unit
320 signal measurement unit
330 calculation unit
340 detection unit
350 storage unit
401, 402, 403 detection system
501 communication system

The invention claimed is:
1. A detection system comprising:
a signal output unit configured to output, to a measurement target, a measurement signal that exhibits a predetermined temporal change;
a signal measurement unit configured to measure a response signal, to the measurement signal, from the measurement target;
a calculation unit configured to calculate an impulse response of the measurement target, based on a measurement result of the response signal measured by the signal measurement unit; and
a detection unit configured to detect abnormality regarding the measurement target, based on the impulse response calculated by the calculation unit.
2. The detection system according to claim 1, wherein
the detection unit calculates a response waveform, to a reference signal, of the measurement target, based on the impulse response and on waveform information of the reference signal which is a predetermined signal, and specifies an abnormality occurrence position in the measurement target, based on the calculated response waveform.
3. The detection system according to claim 1, wherein
the detection unit detects abnormality regarding the measurement target, based on a result of comparison between frequency characteristics of the impulse response, and frequency characteristics of the impulse response based on a past measurement result of the response signal measured by the signal measurement unit.
4. The detection system according to claim 1, wherein
the signal output unit notifies the signal measurement unit of a timing about output of the measurement signal, and
the signal measurement unit measures the response signal in synchronization with the signal output unit by using the timing notified from the signal output unit.
5. The detection system according to claim 1, wherein
the measurement target is a transmission path, and
the detection unit detects, as abnormality regarding the measurement target, connection of new equipment to the transmission path.
6. A detection device comprising:
a signal output unit configured to output, to a measurement target, a measurement signal that exhibits a predetermined temporal change;

a signal measurement unit configured to measure a response signal, to the measurement signal, from the measurement target;

a calculation unit configured to calculate an impulse response of the measurement target, based on a measurement result of the response signal measured by the signal measurement unit; and a detection unit configured to detect abnormality regarding the measurement target, based on the impulse response calculated by the calculation unit.

7. A detection method in a detection system, comprising:

outputting, to a measurement target, a measurement signal that exhibits a predetermined temporal change;

measuring a response signal, to the measurement signal, from the measurement target;

calculating an impulse response of the measurement target, based on a measurement result of the response signal; and detecting abnormality regarding the measurement target, based on the calculated impulse response.

* * * * *